(12) United States Patent
Okuma et al.

(10) Patent No.: US 11,128,592 B2
(45) Date of Patent: Sep. 21, 2021

(54) INFORMATION PROCESSING APPARATUS

(71) Applicant: FUJIFILM Business Innovation Corp., Tokyo (JP)

(72) Inventors: Tomoko Okuma, Kanagawa (JP); Tomoki Taniguchi, Kanagawa (JP); Motoki Taniguchi, Kanagawa (JP); Shotaro Misawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/051,504

(22) Filed: Aug. 1, 2018

(65) Prior Publication Data

US 2019/0124034 A1 Apr. 25, 2019

(30) Foreign Application Priority Data

Oct. 24, 2017 (JP) .............................. JP2017-204987

(51) Int. Cl.
| | |
|---|---|
| *H04L 12/58* | (2006.01) |
| *G06Q 10/10* | (2012.01) |
| *G06F 40/268* | (2020.01) |

(52) U.S. Cl.
CPC ............ *H04L 51/26* (2013.01); *G06F 40/268* (2020.01); *G06Q 10/107* (2013.01); *H04L 51/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,279,000 | B1* | 8/2001 | Suda | G06Q 10/109 |
| 8,280,906 | B1* | 10/2012 | Lillibridge | G06Q 30/00 |
| | | | | 707/784 |
| 8,744,979 | B2* | 6/2014 | Sundelin | G06Q 10/107 |
| | | | | 706/12 |
| 9,569,700 | B1* | 2/2017 | Santos | G06F 16/51 |
| 9,697,192 | B1* | 7/2017 | Estes | G06F 17/2785 |
| 9,892,133 | B1* | 2/2018 | Biessmann | G06F 16/5838 |
| 2003/0040986 | A1* | 2/2003 | Hoffman | G06Q 10/087 |
| | | | | 705/28 |
| 2004/0205065 | A1* | 10/2004 | Petras | C07C 7/06 |
| 2006/0069740 | A1* | 3/2006 | Ando | H04W 4/44 |
| | | | | 709/217 |
| 2007/0269045 | A1* | 11/2007 | Kurihara | H04L 9/0822 |
| | | | | 380/201 |
| 2010/0223092 | A1* | 9/2010 | Kitabatake | G06Q 10/10 |
| | | | | 705/7.11 |
| 2012/0102114 | A1* | 4/2012 | Dunn | G06Q 50/01 |
| | | | | 709/204 |
| 2013/0318021 | A1 | 11/2013 | Tateno et al. | |
| | | | (Continued) | |

FOREIGN PATENT DOCUMENTS

| | | | |
|---|---|---|---|
| JP | 2006139695 | | 6/2006 |
| JP | 2006139695 | A * | 6/2006 |
| JP | 2013246683 | | 12/2013 |

*Primary Examiner* — Ranodhi Serrao
(74) *Attorney, Agent, or Firm* — JCIPRNET

(57) ABSTRACT

An information processing apparatus includes a determination unit that determines a delivery priority of delivery target information on the basis of a disclosure possibility of the delivery target information and a necessity of the information for a receiver, and a disclosure unit that discloses the information to the receiver according to the delivery priority.

16 Claims, 33 Drawing Sheets

(56) References Cited

U.S. PATENT DOCUMENTS

| | | | |
|---|---|---|---|
| 2013/0339369 A1* | 12/2013 | Li | G06F 16/951 |
| | | | 707/742 |
| 2014/0297770 A1* | 10/2014 | Wada | H04L 51/02 |
| | | | 709/206 |
| 2016/0034305 A1* | 2/2016 | Shear | G06F 16/245 |
| | | | 707/722 |
| 2017/0083969 A1* | 3/2017 | Takeda | G06F 16/3344 |
| 2017/0140048 A1* | 5/2017 | Wang | G06Q 10/1093 |
| 2017/0331916 A1* | 11/2017 | Banatwala | H04L 67/306 |

* cited by examiner

| MESSAGE LOG ID 410 | DATE AND TIME 420 | SENDER 430 | RECEIVER 440 | MESSAGE 450 | 400 |
|---|---|---|---|---|---|
| | | | | | |

| REQUEST LOG ID 510 | DATE AND TIME 520 | REQUESTER 530 | DISCLOSER 540 | APPROVAL 550 | INFORMATION 560 | 500 |
|---|---|---|---|---|---|---|
| | | | | | | |

(a)
GENERAL AFFAIRS DEPARTMENT, MR. N
I MAILS YOU FOR ASKING ABOUT OVERSEAS BUSINESS TRIPS.
FIRST OF ALL, DO I BOOK MY TICKETS FOR MYSELF?
OR MAY I ASK MR. N?
THEN, HOW SHOULD I MAKE ARRANGEMENTS FOR
ACCOMMODATION? KIND REGARDS.
X LABORATORY, F

900

(b)
950 — NUMBER OF SENTENCES: 6
NUMBER OF INTERROGATORY
960 — SENTENCES: 3
PROPORTION OF
970 — INTERROGATORY SENTENCES: 0.5

X LABORATORY, MR. F
THANK YOU FOR YOUR HARD WORK.
AS FOR THE FOLLOWING MATTER,

>FIRST OF ALL, DO I BOOK MY TICKETS FOR MYSELF?

IF YOU WOULD LIKE TO INFORM US OF A DESIRED FLIGHT NUMBER OR DEPARTURE DATE AND WE WILL ARRANGE IT HERE.

>OR MAY I ASK MR. N? THEN, HOW SHOULD I MAKE ARRANGEMENTS FOR ACCOMMODATION?

PLEASE BOOK YOUR ACCOMMODATION AND MAKE A RECEIPT SETTLEMENT, OR SUBMIT A RESERVATION REQUEST FORM TO THE OX TRAVEL.
IN THAT CASE, IT WILL BE PROCESSED THROUGH DEPARTMENT CHANGE.

GENERAL AFFAIRS DEPARTMENT, N (a)

1450 — NUMBER OF SENTENCES: 7
       NUMBER OF RESPONSE
1460 — SENTENCES: 3
       NUMBER OF INTERROGATORY
1470 — SENTENCES: 0
       PROPORTION OF RESPONSE
1480 — SENTENCES: 0.43

MAIL OF A

IT SEEMS THAT SEALING REQUEST APPLICATION METHOD HAS BEEN CHANGED. PLEASE ASK MR. N OF GENERAL AFFAIRS DEPARTMENT DETAILS THEREOF. ~1600

FIG. 16B

MAIL OF B

IT SEEMS THAT SEALING REQUEST APPLICATION METHOD HAS BEEN CHANGED. I WILL INFORM YOU WHAT I HEARD FROM N WHILE AGO.

【CHANGES】
· LATEST VERSION OF SEALING REQUEST IS PLACED ON WEBSITE OF GENERAL AFFAIRS DEPARTMENT.
· APPROVAL OF DIRECTOR IS NO LONGER NECESSARY, BUT COPY OF <u>APPROVAL DOCUMENT</u> IS ATTACHED AT THE TIME OF APPLICATION.

THANK YOU.

MAIL OF C

1620

SEALING REQUEST APPLICATION METHOD HAS BEEN CHANGED, AND THUS SEALING REQUEST IS RENEWED.

PLEASE ASK MR. N OF GENERAL AFFAIRS DEPARTMENT DETAILS THEREOF.

FIG. 16D

| INFORMATION PROVIDER | DISCLOSURE APPROVAL PROPORTION |
|---|---|
| A | 50% |
| B | 15% |
| C | 40% |

FIG. 16E

| MAIL | DISCLOSURE POSSIBILITY | RECEIVER NEEDS | DELIVERY PRIORITY |
|---|---|---|---|
| A | 0.5 | 1 | 0.5 |
| B | 0.15 | 3 | 0.45 |
| C | 0.4 | 2 | 0.8 |

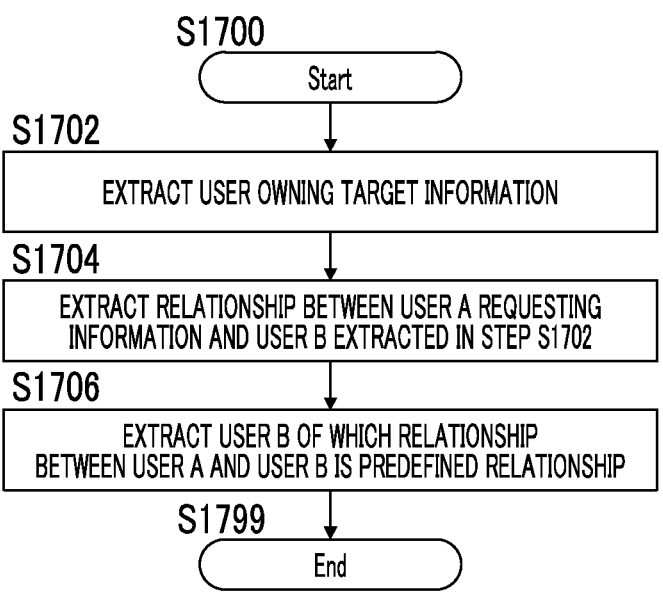
FIG. 17
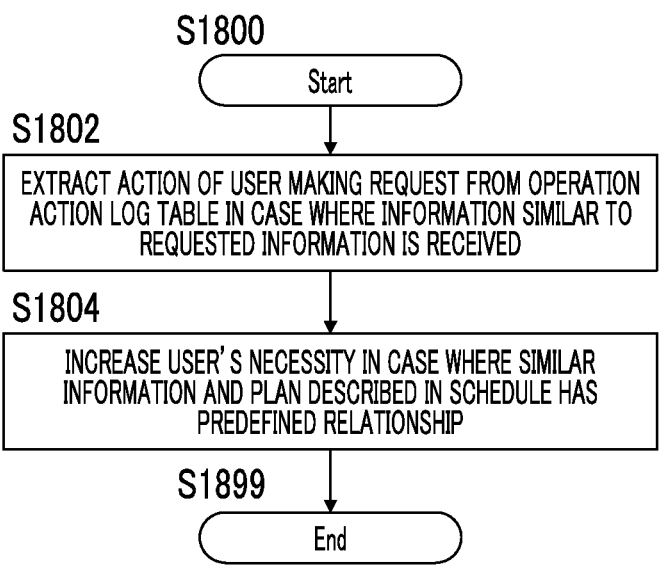
FIG. 18
FIG. 19
| OPERATION ACTION LOG ID | DATE AND TIME | USER | OPERATION ACTION |
|---|---|---|---|
|  |  |  |  |
1910 1920 1930 1940 — 1900

IT IS HARD TO GO TO UNIVERSITY WHILE WORKING, BUT REQUIREMENT FOR DOCTORIAL DISSERTATION IS MUCH MORE DIFFICULT SINCE NUMBER OF PAPERS IS DOUBLED! ALTHOUGH IT MAY NOT COST TUITION, UNIVERSITY HAS DIFFERENT REQUIREMENTS FOR OBTAINING DEGREE, SO I THINK THAT FURTHER EXAMINATION IS BETTER, BUT RELATED INFORMATION IS NOT OPEN MUCH …

2220

WHILE IT IS HARD TO PROMOTE CAREER CHANGE WHILE WORKING, WE RECOMMEND THAT YOU REGISTER YOURSELF IN PLURAL CAREER CHANGE AGENTS.
IT IS ALSO IMPORTANT TO CHECK THINGS SUCH AS SALARY AND PAY RAISE BEFOREHAND PROPERLY!
I THINK THAT FURTHER EXAMINATION IS BETTER BECAUSE COMPANIES ARE DIFFERENT FOR EACH AGENT, BUT THE RELATED INFORMATION IS NOT OPEN MUCH…

2215

UNIVERSITY'S TUITION WAS 1 MILLION YEN IN FIRST YEAR DUE TO ENTRANCE FEE, BUT IT WAS ABOUT 600,000 YEN AFTER THAT.
BECAUSE UNIVERSITY WAS PRIVATE UNIVERSITY, I THINK THAT TUITION AND FEES ARE HIGH COMPARED WITH NATIONAL UNIVERSITIES.

2225

SALARY OF C COMPANY WAS 6 MILLION YEN INCLUDING TAX IN FIRST YEAR, BUT THEREAFTER IT WAS RAISED TO ABOUT 6.5 MILLION YEN.
I THINK THAT SALARY LEVEL IS HIGH COMPARED WITH OTHER COMPANIES.

INFORMATION PROCESSING APPARATUS

CROSS-REFERENCE TO RELATED APPLICATIONS

This application is based on and claims priority under 35 USC 119 from Japanese Patent Application No. 2017-204987 filed Oct. 24, 2017.

BACKGROUND

(i) Technical Field

The present invention relates to an information processing apparatus.

(ii) Related Art

JP2013-246683A discloses a technique in which, in order to increase a possibility of a user receiving recommended items, an experience information extracting unit extracts experience information which is information regarding an experience, from text data input from a user, a content selecting unit performs at least one of extraction or priority setting of content to be presented to the user on the basis of the extracted experience information, and a presentation control unit controls presentation of content to the user on the basis of a result of the extraction or the priority setting of the content, and the technique is applicable, for example, to a server which recommends various items.

JP2006-139695A discloses a technique in which, in order to automatically generate a delivery schedule adapted to a user's preference and reception environment, a deliverer's delivery request, and the like from a huge amount of content, a delivery schedule generation apparatus uses a content delivery policy, content attribute information, user attribute information including use preference conditions, and use history information to calculate delivery priority values based on each user's use preference conditions and delivery priority values based on the content delivery policy, and uses both priority values to determine the delivery priority of each piece of content; and the description and registration of the content delivery policy and use preference conditions are standardized in an XML format, and content of quality optimum to each user is selected and scheduled by using delivery time limit conditions and the user's content reception environment information.

SUMMARY

Information is delivered in response to a user's needs. There is a case where information to be delivered is not open information but information belonging to an individual. The information belonging to an individual may not be necessarily open. On the other hand, a user's needs is individually and specifically determined, and is not necessarily high at all times.

Aspects of non-limiting embodiments of the present disclosure relate to an information processing apparatus which can deliver information belonging to an individual to a necessary user.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing apparatus including a determination unit that determines a delivery priority of delivery target information on the basis of a disclosure possibility of the delivery target information and a necessity of the information for a receiver, and a disclosure unit that discloses the information to the receiver according to the delivery priority.

BRIEF DESCRIPTION OF THE DRAWINGS

Exemplary embodiment(s) of the present invention will be described in detail based on the following figures, wherein:

FIG. 14 is a diagram illustrating a process example according to the present exemplary embodiment;

FIGS. 16A to 16E are diagrams illustrating a process example according to the present exemplary embodiment;

FIG. 17 is a flowchart illustrating a process example according to the present exemplary embodiment;

FIG. 18 is a flowchart illustrating a process example according to the present exemplary embodiment;

FIG. 19 is a diagram illustrating a data structure example of an operation action log table;

FIG. 22 is a diagram illustrating a process example according to the present exemplary embodiment;

DETAILED DESCRIPTION

Hereinafter, with reference to the drawings, a description will be made of an exemplary embodiment for realizing the invention.

Figure 1:
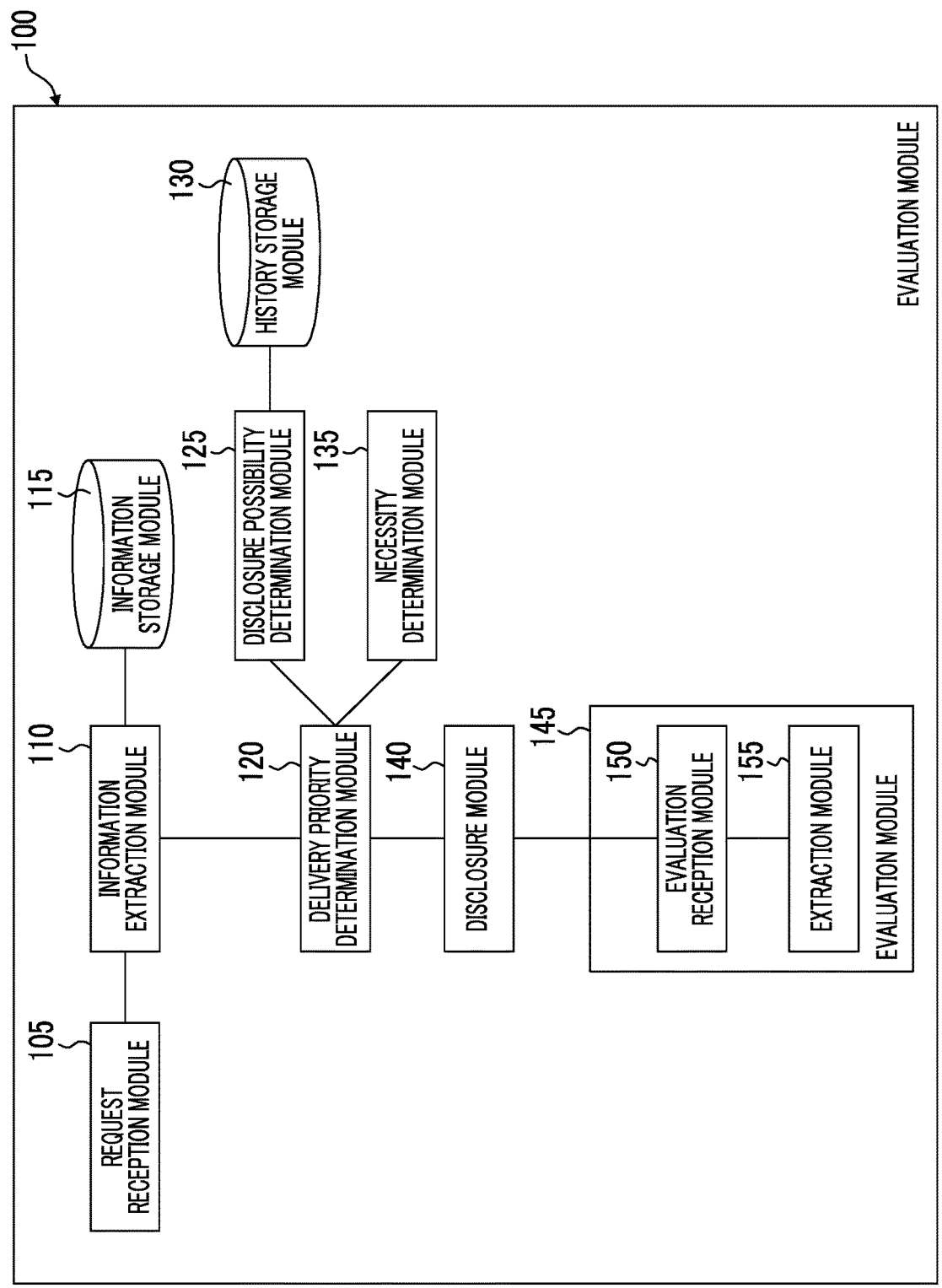
FIG. 1 is a conceptual module configuration diagram illustrating a configuration example according to the present exemplary embodiment.

FIG. 1 is a conceptual module configuration diagram illustrating a configuration example according to the present exemplary embodiment.

The module generally indicates components such as software (computer program) or hardware which can be logically divided. Therefore, the module in the present exemplary embodiment indicates not only a module in a computer program but also a module in a hardware configuration. Therefore, in the present exemplary embodiment, a description will also be made of a computer program (a program causing a computer to execute each procedure, a program causing a computer to each unit, or a program a computer to realize each function), a system, and a method for functioning as such a module. However, for convenience of description, "storing", "being stored", or words equivalent thereto are used, but, these words indicate that a storage device stores data or a storage device is controlled to store data in a case where an exemplary embodiment is a computer program. A module may correspond to a function on a one-to-one basis, and, in installation, a single module may be configured with a single program, a plurality of modules may be configured with a single program, and, conversely, a single module may be configured with a plurality of programs. A plurality of modules may be executed by a single computer, and a single module may be executed by a plurality of computers in a distributed or parallel environment. Other modules may be included in a single module. Hereinafter, the term "connection" indicates only physical connection but also logical connection (transmission and reception of data, indication, a reference relationship between pieces of data, login, and the like). The term "setting in advance" indicates that setting is performed prior to a target process, and indicates not only that setting is performed before a process according to the present exemplary embodiment is started but also that, even after a process according to the present exemplary embodiment is started, setting is performed depending on a situation or a state at the time or a situation or a state hitherto in a case where a target process is not performed. In a case where there are "a plurality of preset values", the values may be different from each other, and two or more values may be the same as each other (of course, including all of the values). The description that "in a case of A, B is performed" indicates that "it is determined whether or not A is satisfied, and, in a case where it is determined that A is satisfied, B is performed". However, this excludes a case where determination of whether or not A is satisfied is unnecessary. In a case where objects are listed such as "A, B, and C", the objects are exemplarily listed unless otherwise mentioned, and a case where only one thereof (for example, only A) is selected is included.

A system or an apparatus also includes not only a case where a plurality of computers, pieces of hardware, and apparatuses are configured to be connected to each other via a communication unit such as a network (including communication connection on a one-to-one basis) but also a case of being configured with a single computer, a single piece of hardware, and a single apparatus. The "apparatus" and the "system" are used as terms having an identical meaning. Of course, the "system" does not include systems that are merely a social "mechanism" (social system) which is an artificial arrangement.

Target information is read from a storage device, the process is performed, and a process result is written to the storage device for each process performed by each module or for each process in a case where a plurality of processes are performed in a module. Therefore, description of reading for a storage device before a process and writing for the storage device after the process will be omitted. The storage device here may include a hard disk, a random access memory (RAM), an external storage medium, a storage device connected via a communication line, a register in a central processing unit (CPU), or the like.

An information processing apparatus 100 according to the present exemplary embodiment delivers information belonging to an individual to a necessary user, and includes, as illustrated in an example in FIG. 1, a request reception module 105, an information extraction module 110, an information storage module 115, a delivery priority determination module 120, a disclosure possibility determination module 125, a history storage module 130, a necessity determination module 135, a disclosure module 140, and an evaluation module 145.

The request reception module 105 is connected to the information extraction module 110. The request reception module 105 receives a request for information in response to an operation of a user (hereinafter, also referred to as an information requester or an information receiver). As the "request for information (also simply referred to as information request)", for example, a search condition, a question, or a demand is received. Specifically, there is a case where a user wants to know an in-company application method (knowhow).

The information extraction module 110 is connected to the request reception module 105, the information storage module 115, and the delivery priority determination module 120. The information extraction module 110 extracts information corresponding to an information request from information (hereinafter, also referred to as a message) stored in the information storage module 115. A technique of extracting a response to the information request may employ an existing technique. For example, the past information request (2) including a word in the present information request (1) may be retrieved, and a response to the information request (2) may be extracted. Information including the word in the present information request (1) may be extracted. However, information in which a question sentence includes the word in the information request (1) may be excluded (that is, information in which a declarative sentence includes the word in the information request (1) is extracted).

The information storage module 115 is connected to the information extraction module 110. The information storage module 115 stores information which may serve as a response. Particularly, information belonging to an individual may be stored. For example, the information belonging to an individual may be an electronic mail, chats, or conversations in a social networking service (SNS). Such information may or not be open to a third party. However, in a case of information not open to a third party, a permission is required to be obtained from an owner of the information. Particularly, in a case of information including privacy or secret, a permission is required to be obtained from an owner of the information. In a case of an electronic mail, chats, or conversations in an SNS, it is hard to assign an access right to each piece of information (message). This is because target information is a large amount, and is not inherently disclosed except for a partner. However, there is a case where the information may include information needed by another person (a person requesting the information), and may be allowed to be disclosed. To do so, the information processing apparatus 100 delivers information in the information storage module 115 to a person requesting the information within an allowable range.

Figures 4, 5, 6:
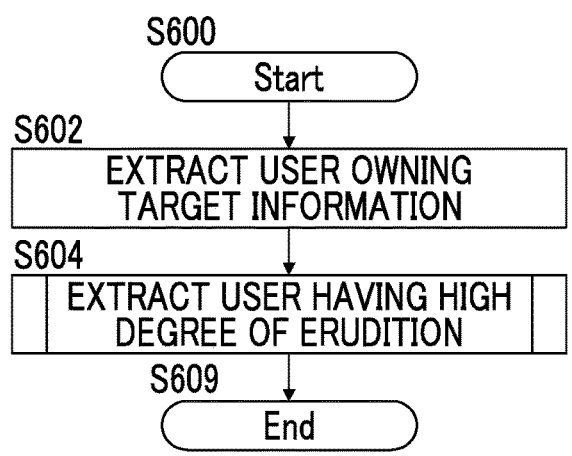
FIG. 4 is a diagram illustrating a data structure example of a message log table.
FIG. 5 is a diagram illustrating a data structure example of a request log table.
FIG. 6 is a flowchart illustrating a process example according to the present exemplary embodiment.

For example, the information storage module 115 stores a message log table 400. FIG. 4 is a diagram illustrating a data structure example of the message log table 400. The message log table 400 has a message log ID field 410, a date and time field 420, a sender field 430, a receiver field 440, and a message field 450. In the present exemplary embodiment, the message log ID field 410 stores information (message log identification (ID)) for uniquely identifying a history (log) of a message. The date and time field 420 stores the date and time (transmission date and time, reception date and time, or the like) at which the message is generated. The date and time may be year, month, day, hour, minute, second, second or less, or a combination thereof. The sender field 430 stores a sender of the message (a person who owns the message). The receiver field 440 stores a receiver of the message. The message field 450 stores the message. The message field 450 may store the message, and may store a location (for example, a uniform resource locator (URL)) where the message is stored.

The delivery priority determination module 120 is connected to the information extraction module 110, the disclosure possibility determination module 125, the necessity determination module 135, and the disclosure module 140. The delivery priority determination module 120 determines delivery priority of the information on the basis of a disclosure possibility of delivery target information (that is, information extracted by the information extraction module 110) and the necessity of the information for a receiver. In other words, delivery priority (an index indicating whether or not the information can be disclosed) is determined on the basis of two items such as (1) a disclosure possibility in a user who owns the information and (2) the necessity in a user who needs the information.

The delivery priority determination module 120 may determine a disclosure possibility of delivery target information by using a word in the delivery target information and a word used in disclosed information.

The delivery priority determination module 120 may edit delivery target information by using an editing result of disclosed information.

For example, the delivery priority determination module 120 may perform machine learning by using an editing result of disclosed information as teacher data, and may edit delivery target information by using a result (edited model) of the machine learning.

The disclosure possibility determination module 125 is connected to the delivery priority determination module 120 and the history storage module 130. The disclosure possibility determination module 125 may determine a disclosure possibility on the basis of a history of disclosure propriety in an owner of target information.

For example, the disclosure possibility determination module 125 may use a history of disclosure propriety in an owner whose degree of erudition is more than or equal to or more than a predefined value.

Here, the "degree of erudition" indicates a possibility that a person may be erudite (so-called man of extensive reading and tenacious memory).

The disclosure possibility determination module 125 may determine the degree of erudition on the basis of the number of question messages received by an owner. Specifically, regarding determination of a "question message", in a case where a proportion of question sentences included in a message is more than or equal to or more than a predetermined threshold value, the message may be determined as being a question message.

The disclosure possibility determination module 125 may use a history of disclosure propriety in an owner whose degree of teaching is more than or equal to or more than a predefined value.

Here, "degree of teaching" indicates a possibility of being a person who teaches well.

The disclosure possibility determination module 125 may determine the degree of teaching on the basis of the number of question sentences in a message received by an owner and the number of declarative sentences in a reply message.

The disclosure possibility determination module 125 may determine an owner of information on the basis of a relationship with a receiver.

The disclosure possibility determination module 125 may determine an owner by using one or more of (1) the number of times of transmission and reception of messages, (2) a distance on an organization chart, (3) the way of using honorific expressions, and (4) attributes of both of a receiver and an owner between the receiver and the owner.

The history storage module 130 is connected to the disclosure possibility determination module 125. The history storage module 130 stores a history of information extracted by the information extraction module 110 in the past. For example, a user requesting information, a user who owns the information, information indicating whether or not the information is disclosed (whether or not the owner approves the request), and a set of the information are stored.

For example, the history storage module 130 stores a request log table 500. FIG. 5 is a diagram illustrating a data structure example of the request log table 500. The request log table 500 has a request log ID field 510, a date and time field 520, a requester field 530, a discloser field 540, an approval field 550, and an information field 560. The request log ID field 510 stores information (log request ID) for uniquely identifying a log request in the present exemplary embodiment. The date and time field 520 stores the date and time at which the request occurs. The requester field 530 stores a person making the request. The discloser field 540 stores a discloser (a person owning the information) for the request. The approval field 550 stores information indicating whether or not the discloser approves the request (whether or not the information is disclosed). The information field 560 stores disclosure target information (message).

The necessity determination module 135 is connected to the delivery priority determination module 120. The necessity determination module 135 determines the necessity of target information. Here, the necessity is a concept including the degree of interest or an interest level.

The necessity determination module 135 may determine the necessity on the basis of a history of an action for information of a receiver. In a case where information requested in the past is not effectively used, it is determined that the present necessity is also low. For example, the case corresponds to a case, although information is delivered, the information is not input to a schedule management program (hereinafter, referred to as, simply referred to as a schedule in some cases).

For example, the necessity determination module 135 may use a history of an action of receiving information similar to delivery target information. In the above example, an action (an action of extracting information regardless of whether or not the information is similar to delivery target information) in all deliveries performed on the past request for information is used, but the accuracy of the necessity of information obtained through the present request is increased by using the past action performed on information similar to delivery target information.

In a case where received information is viewed, and then the information and a plan described in a schedule have a predefined relationship, the necessity determination module 135 may increase the necessity.

Here, the "case where the information and a plan described in a schedule have a predefined relationship" indicates a case where the information and the plan described in the schedule are identical or similar to each other, and includes a case where the information is similar to the plan described in the schedule, and part of the information is the same as the plan.

The disclosure module 140 is connected to the delivery priority determination module 120, and an evaluation reception module 150 of the evaluation module 145. The disclosure module 140 discloses (delivers) target information to a receiver according to a delivery priority determined by the delivery priority determination module 120. For example, the disclosure of information may include not only display on a display device such as a liquid crystal display but also output as a three-dimensional (3D) image, and may include a combination of printing in a printing apparatus such as a printer, output of voices from a voice output apparatus such as a speaker, and vibration.

Specifically, the disclosure module 140 performs a process in which, in a case where a delivery priority is more than or equal to or more than a predefined threshold value, information is disclosed to a receiver, and, in a case where the delivery priority is equal to or less than or less than the predefined threshold value, the information is not disclosed to the receiver.

In disclosure of information, the disclosure module 140 may present the information to an owner of the information, and may obtain approval for disclosure to another person. In a case where the owner gives approval, the information is disclosed, and in a case where the owner does not give approval, the information is not disclosed.

In disclosure of information, the disclosure module 140 may receive an owner's editing operation on the information, and may edit the information according to the editing operation. The edited information is disclosed. For example, editing such as deleting a personal information part or adding attention for the use of the information is performed.

The evaluation module 145 includes the evaluation reception module 150 and an extraction module 155. The evaluation module 145 evaluates information in response to an operation of a person (receiver) to which the information is presented, and extracts a distribution of evaluation results.

The evaluation reception module 150 is connected to the disclosure module 140 and the extraction module 155. In a case where information is disclosed, the evaluation reception module 150 presents an evaluation item of the information to a receiver, and receives evaluation based on selection of the evaluation items.

For example, the evaluation reception module 150 may change a presented evaluation item according to a distribution extracted by the extraction module 155.

The evaluation reception module 150 may reduce the number of evaluation items to be presented with respect to information belonging to a field in which the number of evaluations is large. The phrase "the number of evaluations being large" indicates that, for example, the number of evaluations is more than or equal to or more than a predefined threshold value, or, in a case where the number of evaluations is sorted in a descending order, the number of evaluations is in a higher rank from a predefined rank, or in an equal or higher rank (a predefined rank or a higher rank from the predefined rank).

Here, the "field" includes, for example, a business field or a sport field. The "distribution of evaluation for a field" is to count the number of evaluation items being evaluated for each field. Therefore, it is possible to specify a field for which a large number of evaluations is integrated, and thus to reduce the number of evaluation items for the field. The number of evaluation items may be maintained without being changed in a field for which the number of evaluations is small. Consequently, it is possible to prevent concentration of evaluation on a specific field by reducing an evaluation bias, and also to reduce useless evaluation.

The extraction module 155 is connected to the evaluation reception module 150. The extraction module 155 extracts a distribution of evaluation received by the evaluation reception module 150.

For example, the extraction module 155 may extract a distribution of evaluation for a field. The field may be attached to information in advance, and may be determined according to a word included in information.

Figure 2:
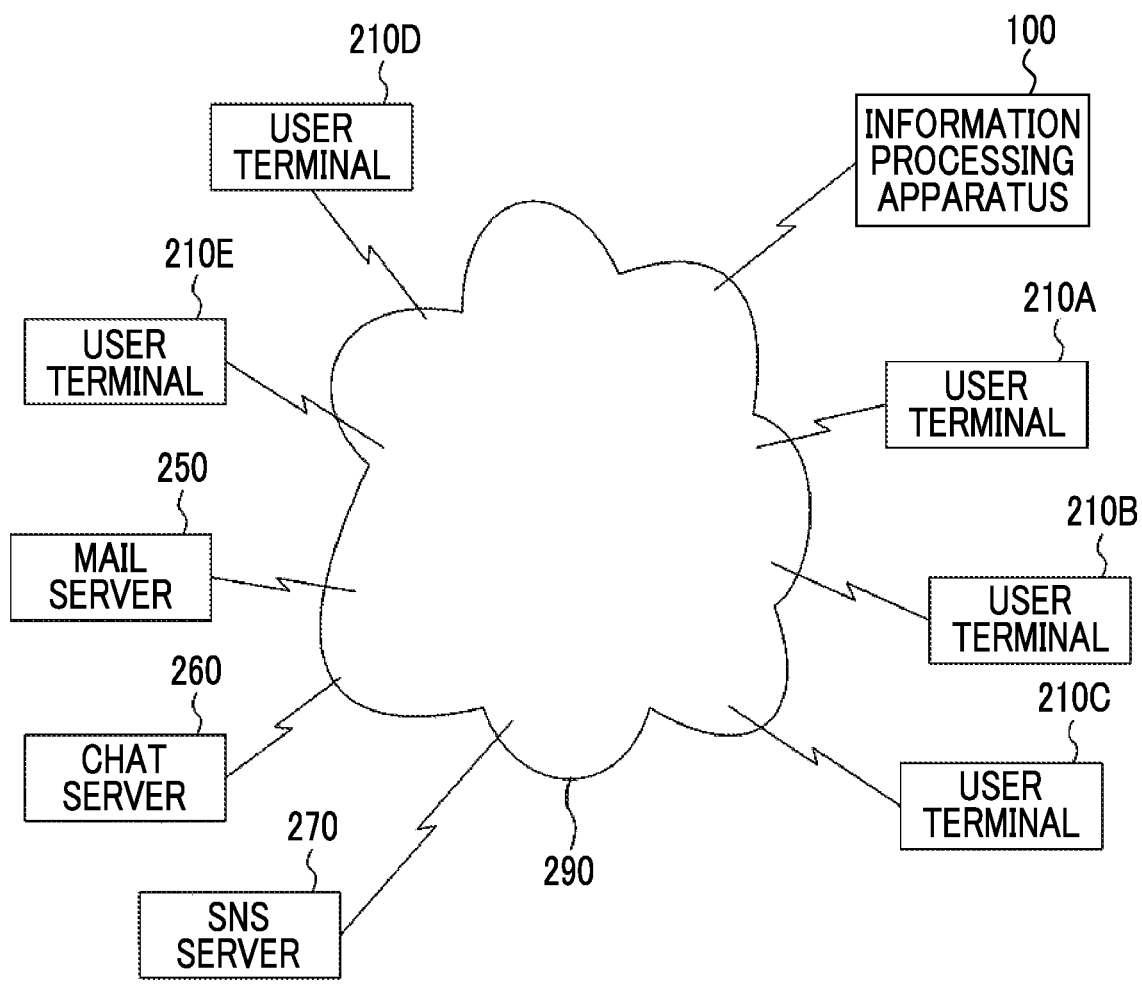
FIG. 2 is a diagram illustrating a system configuration example using the present exemplary embodiment.

FIG. 2 is a diagram illustrating a system configuration example according to the present exemplary embodiment.

The information processing apparatus 100, a user terminal 210A, a user terminal 210B, a user terminal 210C, a user terminal 210D, a user terminal 210E, a mail server 250, a chat server 260, and an SNS server 270 are connected to each other via a communication line 290. The communication line 290 may be a wireless line, a wired line, or a combination thereof, and may be, for example, the Internet, an intranet as a communication infrastructure.

The function of the information processing apparatus 100 may be realized by a cloud service. The information processing apparatus 100 may have one or more functions of the mail server 250, the chat server 260, and the SNS server 270. Conversely, the mail server 250, the chat server 260, and the SNS server 270 may have the function of the information processing apparatus 100.

A user of the user terminal 210 exchanges information (messages) with other users by using the mail server 250, the chat server 260, and the SNS server 270. For example, information is exchanged on a one-to-one basis, or a group including a plurality of persons is formed, and information is exchanged in the group.

A user A of any user terminal 210 requests the information processing apparatus 100 to send information based on a question. The information processing apparatus 100 retrieves information serving as a response, and extracts a user B having information corresponding to the retrieval result. A delivery priority of the information is determined (including whether or not disclosure is to be performed) on the basis of a disclosure possibility and necessity, and the information is disclosed to the user A as a response.

Figure 3:
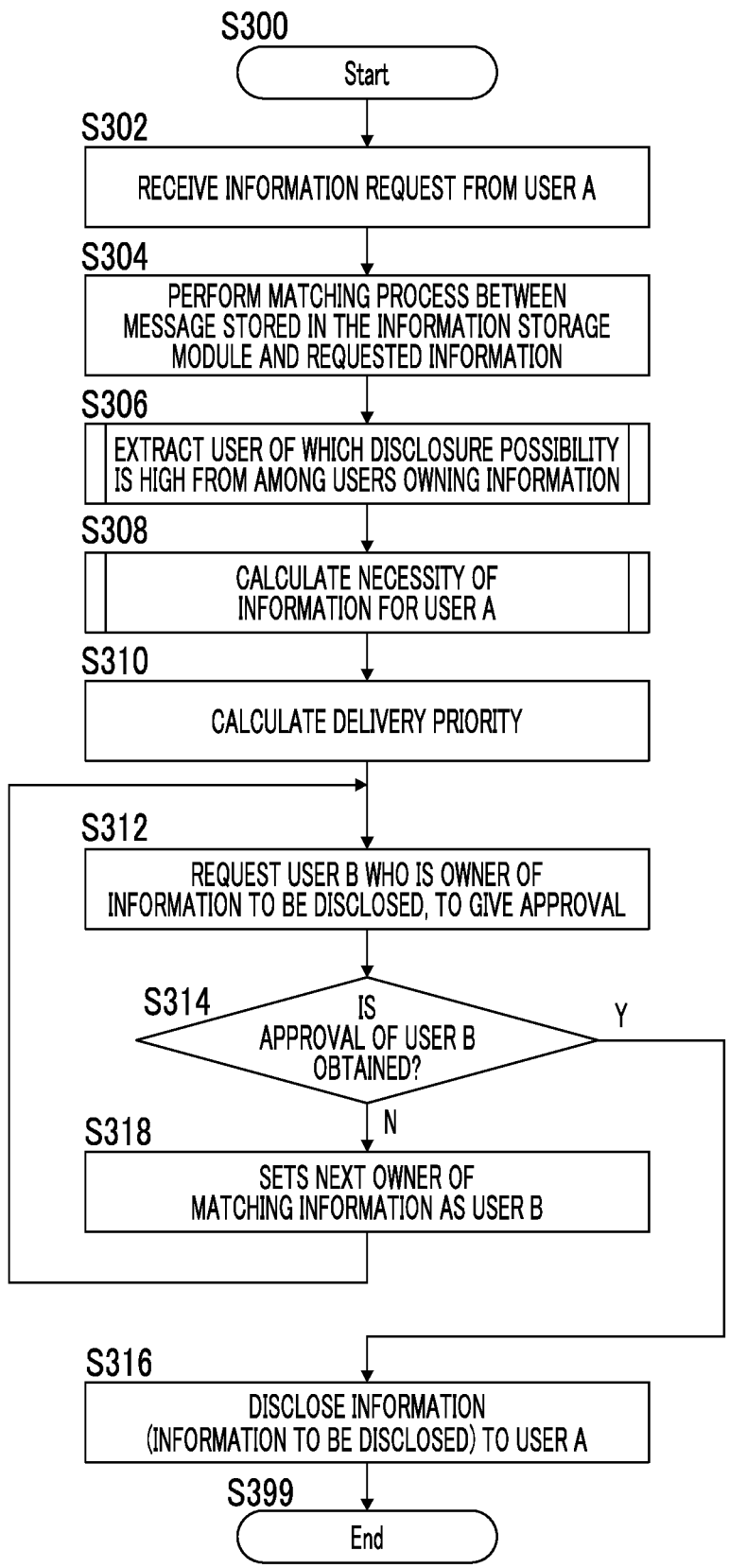
FIG. 3 is a flowchart illustrating a process example according to the present exemplary embodiment.

FIG. 3 is a flowchart illustrating a process example according to the present exemplary embodiment.

In step S302, the request reception module 105 receives an information request from the user A. As described above, a search condition, a question, or a demand is received.

In step S304, the information extraction module 110 performs a matching process between a message stored in the information storage module 115 and the requested information. For example, a plurality of pieces of information are extracted, and a list of pieces of information having a high matching degree is generated.

In step S306, the disclosure possibility determination module 125 extracts a user of which a disclosure possibility is high from among users owning the information. Here, the "user of which a disclosure possibility is high" is a user of which a value indicating a disclosure possibility is greater than or equal to or greater than a predefined threshold value, or a user of which values indicating a disclosure possibility are sorted in a descending order, and are in a rank lower than or equal to or lower than a predefined rank. A detailed process in step S306 will be described later with reference to a flowchart illustrated in examples in FIG. 6, 10, 15, 17 or 21. A plurality of processes may be performed. For example, both of processes in a flowchart of FIG. 6 and a flowchart of FIG. 10 may be performed, and a user of which both of the degree of erudition and the degree of teaching are high may be extracted.

In step S308, the necessity determination module 135 calculates the necessity of the information for the user A. A detailed process in step S308 will be described later with reference to a flowchart illustrated in an example in FIG. 18.

In step S310, the delivery priority determination module 120 calculates a delivery priority. For example, the delivery priority is calculated by multiplying (or adding) a value indicating the disclosure possibility by a value indicating the necessity. This will be described later with reference to a delivery priority table 1640 illustrated in an example in FIG. 16E.

In step S312, the disclosure module 140 requests the user B who is an owner of the information to be disclosed, to give an approval. For example, in a case where the delivery priority is more than or equal to or more than a predefined threshold value, the process in step S312 is performed.

In step S314, the disclosure module 140 determines whether or not an approval of the user B is obtained, and proceeds to step S316 in a case where the approval is obtained, and proceeds to step S318 in other cases.

In step S316, the disclosure module 140 discloses the information (the information to be disclosed) to the user A.

In step S318, the disclosure module 140 sets the next owner of matching information as the user B, and returns to step S312.

FIG. 6 is a flowchart illustrating a process example (a process example in step S306 in the flowchart illustrated in the example in FIG. 3) according to the present exemplary embodiment. In this process, the degree of erudition is used as a disclosure possibility. In other words, a "user having a high disclosure possibility" is extracted by using the degree of erudition.

In step S602, a user owning target information is extracted. Here, the "target information" is disclosure target information.

In step S604, a user having a high degree of erudition is extracted. A detailed process in step S604 will be described later with reference to a flowchart illustrated in an example in FIG. 7.

Figure 7:
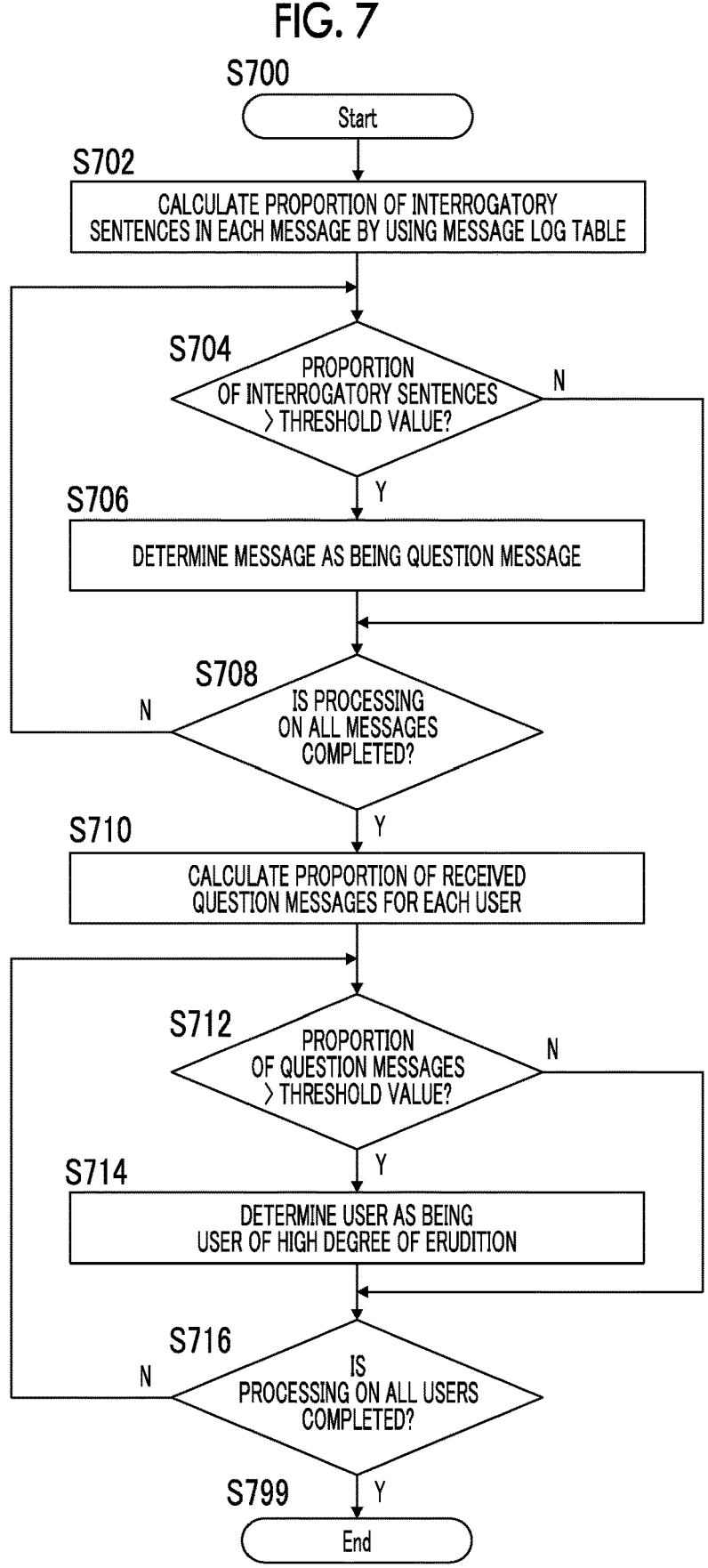
FIG. 7 is a flowchart illustrating a process example according to the present exemplary embodiment.

FIG. 7 is a flowchart illustrating a process example (a process example in step S604 in the flowchart illustrated in the example in FIG. 6) according to the present exemplary embodiment. FIG. 7 corresponds to a process example in which a person having received a large number of question messages is determined as being a person of a high degree of erudition.

In step S702, a proportion of interrogatory sentences in each message is calculated by using the message log table 400. A method of extracting an interrogatory sentence may employ an existing technique. For example, an interrogatory sentence may be extracted by counting the number of question marks (?) at ends of sentences or the number of words indicating a question or a doubt, or by performing a natural language process using morphological analysis, and a sentence determined as being an interrogatory sentence through a natural language process may be extracted. The "proportion of interrogatory sentences" is a proportion of interrogatory sentences to a total number of sentences in a message.

In step S704, it is determined whether or not the proportion of interrogatory sentences is more than a threshold value, and, in a case where the proportion of interrogatory sentences is more than the threshold value, the flow proceeds to step S706, and, in other cases, the flow proceeds to step S708.

In step S706, the message is determined as being a question message.

In step S708, it is determined whether or not processing on all messages is completed, and, in a case where processing is completed, the flow proceeds to step S710, and, in other cases, the flow returns to step S704.

In step S710, a proportion of received question messages for each user is calculated.

In step S712, it is determined whether or not the proportion of question messages is more than a threshold value, and, in a case where the proportion of question messages is more than the threshold value, the flow proceeds to step S714, and, in other cases, the flow proceeds to step S716.

In step S714, the user is determined as being a user of a high degree of erudition.

In step S716, it is determined whether or not processing on all users is completed, and, in a case where processing is completed, the process is finished (step S799), and, in other cases, the flow returns to step S712.

A proportion Mi of interrogatory sentences included in an electronic mail received by a user Ui is calculated, and, in a case where Mi exceeds a threshold value MS, the mail is set as a question mail INTj.

A proportion INTrate of question mails INT included in the number of electronic mails received by the user Ui is calculated.

In a case where the proportion INTrate exceeds a threshold value IS, the user is determined as being an erudite person.

Figure 8:
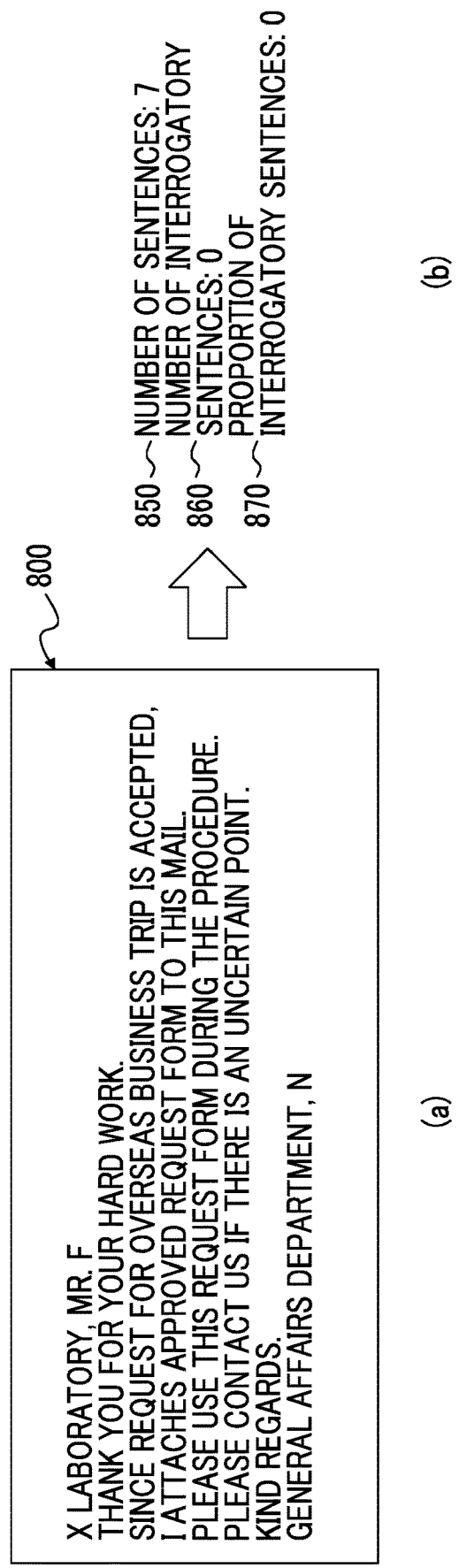
FIG. 8 is a diagram illustrating a process example according to the present exemplary embodiment.

FIG. 8 is a diagram illustrating a process example according to the present exemplary embodiment.

In an example in (a) of FIG. 8, there is the following mail sentence 800. "X Laboratory, Mr. F, thank you for your hard work. Since the request for overseas business trip is accepted, I attach the approved request form to this mail. Please use this request form during the procedure. Please contact us if there is an uncertain point. Kind regards. General Affairs Department, N." From this, the "number of sentences" 850 is seven, the "number of interrogatory sentences" 860 is 0, and a "proportion of interrogatory sentences" 870 is 0. Therefore, it is determined that the mail sentence 800 which is a message is not a question message.

For example, as the "number of sentences" 850, the number of punctuation marks (.) or the number of line feeds may be counted.

The "number of interrogatory sentences" 860 may be obtained, for example, by counting the number of question marks (?) at ends of sentences or the number of words indicating a question or a doubt, or by extracting interrogatory sentences through a natural language process using morphological analysis, and counting the number thereof.

The "proportion of interrogatory sentences" 870 may be obtained by dividing the "number of interrogatory sentences" 860 by the "number of sentences" 850.

Figure 9:
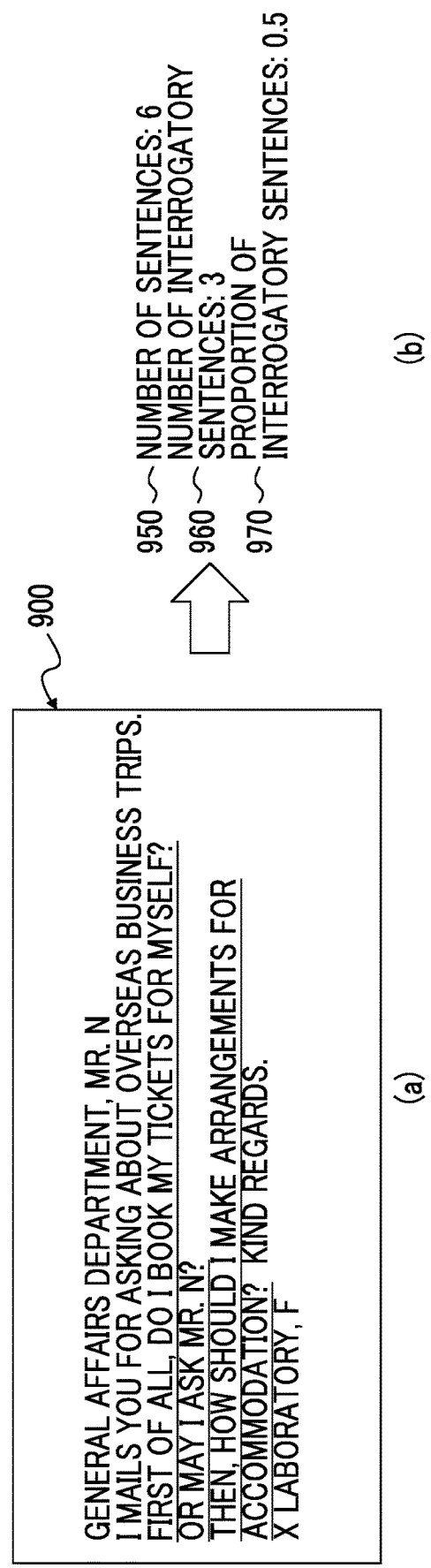
FIG. 9 is a diagram illustrating a process example according to the present exemplary embodiment.

FIG. 9 is a diagram illustrating a process example according to the present exemplary embodiment.

In an example in (a) of FIG. 9, there is the following mail sentence 900. "General Affairs Department, Mr. N. I mails you for asking about overseas business trips. First of all, do I book my tickets for myself? Or may I ask Mr. N? Then, how should I make arrangements for accommodation? Kind regards. X Laboratory, F." From this, the "number of sentences" 950 is six, the "number of interrogatory sentences" 960 is three, and a "proportion of interrogatory sentences" 970 is 0.5. For example, in a case where a threshold value is 0.2, the mail sentence 900 which is a message is determined as being a question message.

Figure 10:
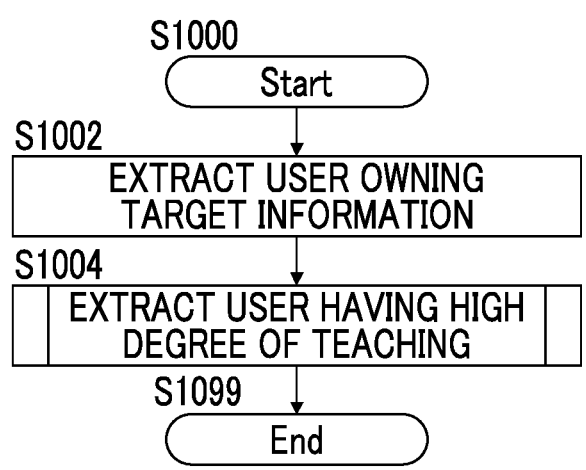
FIG. 10 is a flowchart illustrating a process example according to the present exemplary embodiment.

FIG. 10 is a flowchart illustrating a process example (a process example in step S306 in the flowchart illustrated in the example in FIG. 3) according to the present exemplary embodiment. In this process, the degree of teaching is used as a disclosure possibility. In other words, a "user having a high disclosure possibility" is extracted by using the degree of teaching.

In step S1002, a user owning target information is extracted.

In step S1004, a user having a high degree of teaching is extracted. A detailed process in step S1004 will be described later with reference to flowcharts illustrated in examples in FIGS. 11 and 12.

Figure 11:
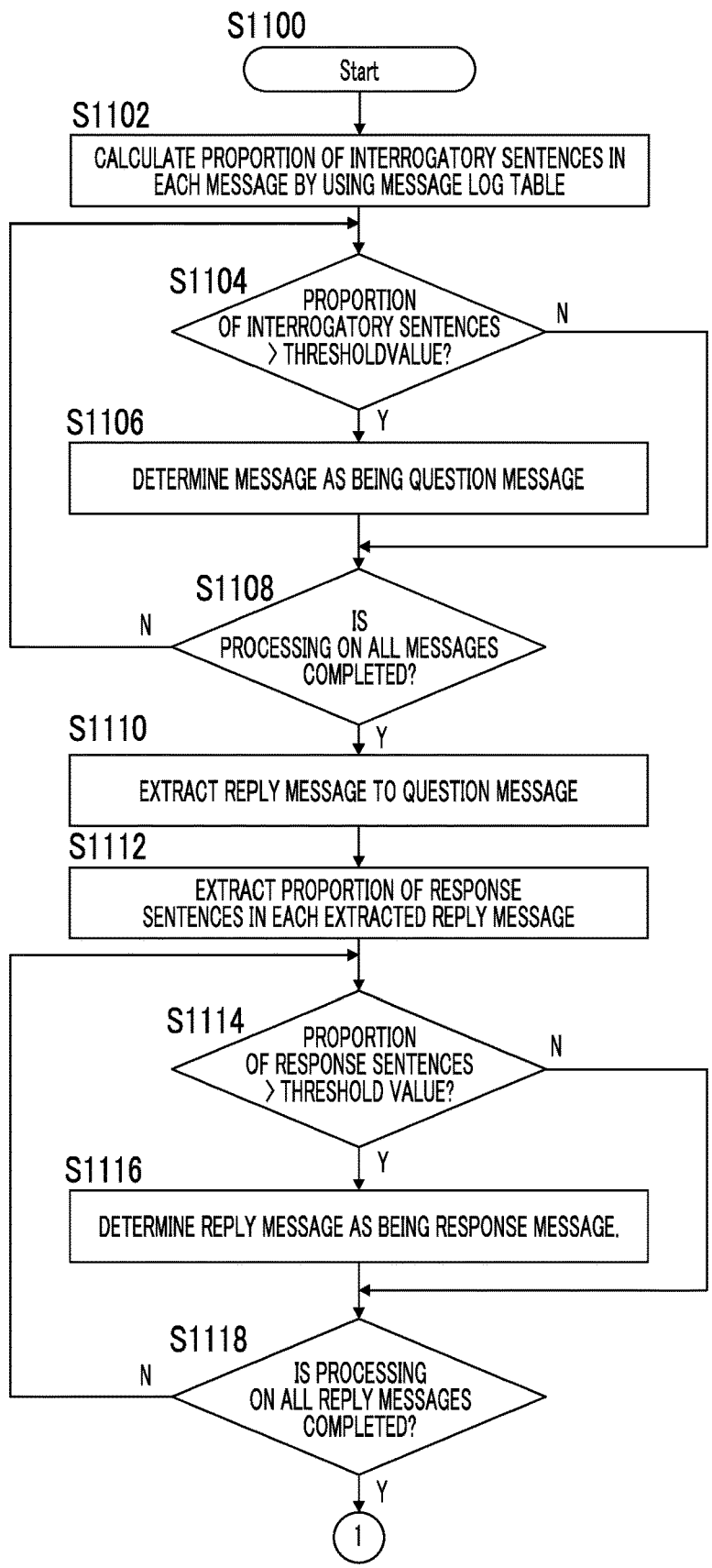
FIG. 11 is a flowchart illustrating a process example according to the present exemplary embodiment.
Figure 12:
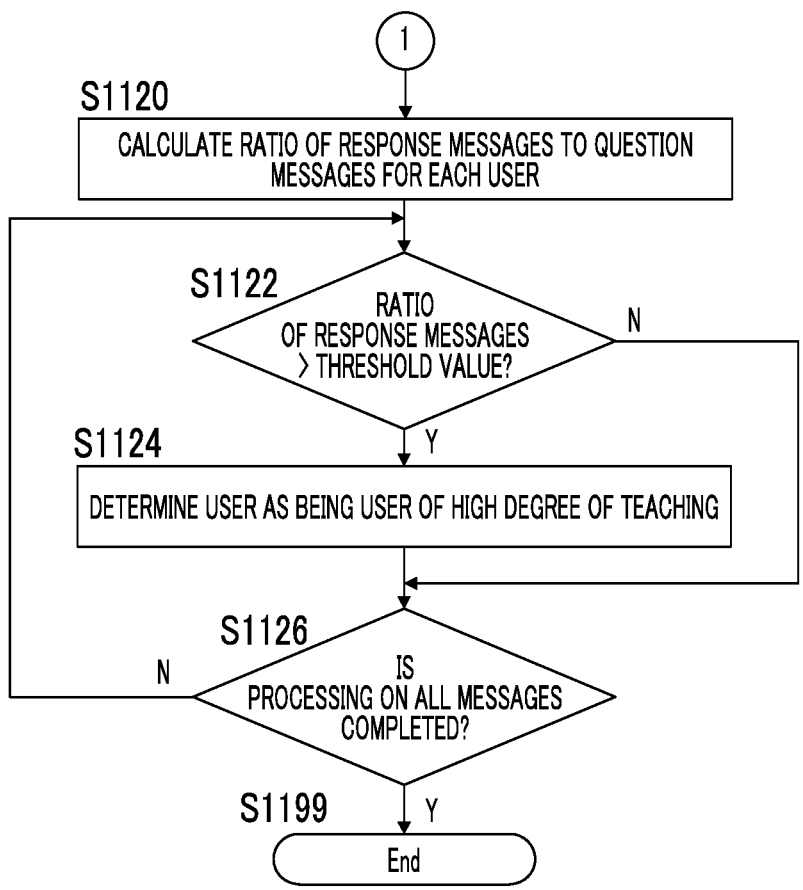
FIG. 12 is a flowchart illustrating a process example according to the present exemplary embodiment.

FIGS. 11 and 12 are flowcharts illustrating a process example (a process example in step S1004 in the flowchart illustrated in the example in FIG. 10) according to the present exemplary embodiment. FIGS. 11 and 12 correspond to a process example in which a person having transmitted a large number of response messages is determined as being a person of a high degree of erudition.

Specifically, a person who receives a question and responds to the question well is estimated from contents of transmitted and received electronic mails, and a "person who teaches well" (a person of a high degree of erudition) is specified.

Processes from step S1102 to step S1108 are equivalent to the processes from step S702 to step S708 in the flowchart illustrated in the example in FIG. 7.

In step S1102, a proportion of interrogatory sentences in each message is calculated by using the message log table 400.

In step S1104, it is determined whether or not the proportion of interrogatory sentences is more than a threshold value, and, in a case where the proportion of interrogatory sentences is more than the threshold value, the flow proceeds to step S1106, and, in other cases, the flow proceeds to step S1108.

In step S1106, the message is determined as being a question message.

In step S1108, it is determined whether or not processing on all messages is completed, and, in a case where processing is completed, the flow proceeds to step S1110, and, in other cases, the flow returns to step S1104.

In step S1110, a reply message to a question message is extracted. An initial message which is transmitted from a receiver of a question message to a sender of the question message after the question message is transmitted may be extracted as a reply message. In a case of an electronic mail, a reply mail to a question mail may be extracted as a reply message by using header information of the electronic mail. In a case where a question sentence in a question message is quoted in a message, the message may be extracted as a reply message.

In step S1112, a proportion of response sentences in each extracted reply message is extracted. For example, a declarative sentence after a quoted question sentence is extracted as a response sentence. The "proportion of response sentences" is a proportion of response sentences to a total number of sentences in the message.

In step S1114, it is determined whether or not the proportion of response sentences is more than a threshold value, and, in a case where the proportion of response sentences is more than the threshold value, the flow proceeds to step S1116, and, in other cases, the flow proceeds to step S1118.

In step S1116, the reply message is determined as being a response message.

In step S1118, it is determined whether or not processing on all reply messages is completed, and, in a case where processing is completed, the flow proceeds to step S1120, and, in other cases, the flow returns to step S1114.

In step S1120, a ratio of response messages to question messages for each user is calculated.

In step S1122, it is determined whether or not the ratio of response messages is more than a threshold value, and, in a case where the ratio of response messages is more than the threshold value, the flow proceeds to step S1124, and, in other cases, the flow proceeds to step S1126.

In step S1124, the user is determined as being a user of a high degree of teaching.

In step S1126, it is determined whether or not processing on all users is completed, and, in a case where processing is completed, the process is finished (step S1199), and, in other cases, the flow returns to step S1122.

A proportion x of interrogatory sentences included in a received electronic mail is calculated. Next, a proportion y of declarative sentences included in a reply electronic mail is calculated. A user is ranked by using the proportion x and the proportion y.

Figure 13:
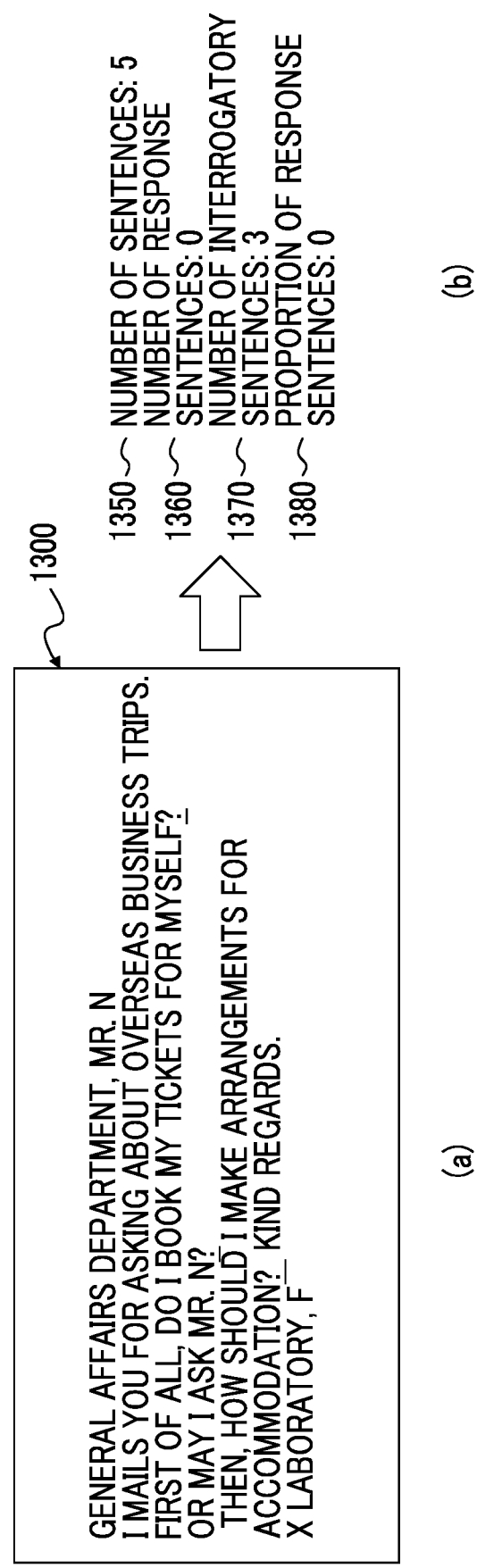
FIG. 13 is a diagram illustrating a process example according to the present exemplary embodiment.

FIG. 13 is a diagram illustrating a process example according to the present exemplary embodiment.

In an example in (a) of FIG. 13, there is the following mail sentence 1300. "General Affairs Department, Mr. N. I mails you for asking about overseas business trips. First of all, do I book my tickets for myself? Or may I ask Mr. N? Then, how should I make arrangements for accommodation? Kind regards. X Laboratory, F." From this, the "number of sentences" 1350 is five, the "number of response sentences" 1360 is 0, the "number of interrogatory sentences" 1370 is three, and a "proportion of response sentences" 1380 is 0. Therefore, it is determined that the mail sentence 1300 which is a message is not a response message.

For example, as the "number of sentences" 1350, the number of punctuation marks (.) or the number of line feeds may be counted.

As the "number of response sentences" 1360, for example, the number of response sentences determined as being response sentences in step S1112 in the flowchart illustrated in the example in FIG. 11 may be counted.

The "number of interrogatory sentences" 1370 may be obtained, for example, by counting the number of question marks (?) at ends of sentences or the number of words indicating a question or a doubt, or by extracting interrogatory sentences through a natural language process using morphological analysis, and counting the number thereof.

The "proportion of response sentences" 1380 may be obtained by dividing the "number of response sentences" 1360 by the "number of sentences" 1350.

FIG. 14 is a diagram illustrating a process example according to the present exemplary embodiment.

In an example in (a) of FIG. 14, there is the following mail sentence 1400. "X Laboratory, Mr. F, thank you for your hard work. As for the following matter, >First of all, do I book my tickets for myself? If you would like to inform us of a desired flight number or departure date and time and we will arrange it here. >Or may I ask Mr. N? Then, how should I make arrangements for accommodation? Please book your accommodation and make a receipt settlement, or submit a reservation request form to the OX Travel. In that case, it will be processed through department change. General Affairs Department, N." From this, the "number of sentences" 1450 is seven, the "number of response sentences" 1460 is three, the "number of interrogatory sentences" 1470 is 0, and a "proportion of response sentences" 1480 is 0.43. For example, in a case where a threshold value is 0.2, the mail sentence 1400 which is a message is determined as being a response message. In addition, ">" is used as a symbol indicating a quoted sentence. In other words, there is a single declarative sentence after the quoted question sentence ">First of all, do I book my tickets for myself?", and there are two declarative sentences after the quoted question sentence ">Or may I ask Mr. N? Then, how should I make arrangements for accommodation?". Therefore, the "number of response sentences" 1460 is three.

Figure 15:
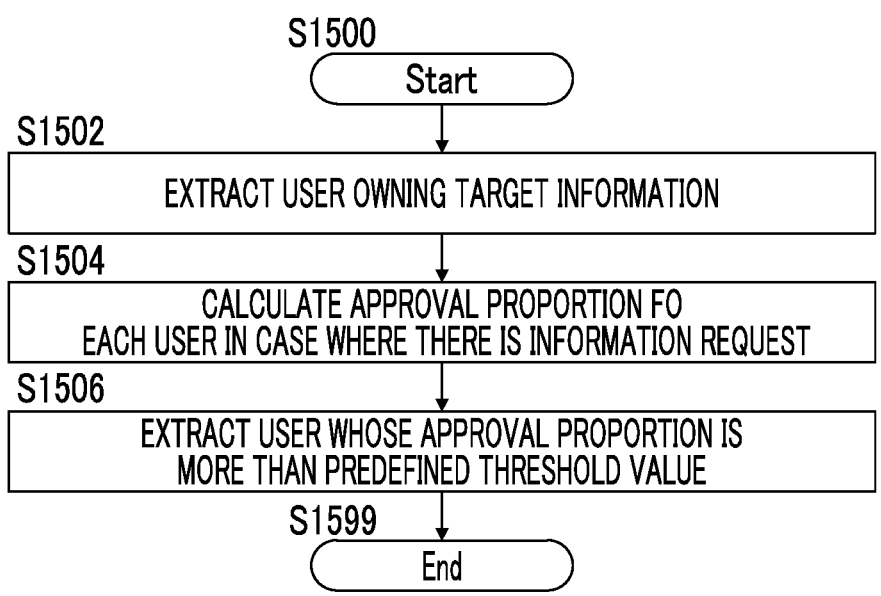
FIG. 15 is a flowchart illustrating a process example according to the present exemplary embodiment.

FIG. 15 is a flowchart illustrating a process example (a process example in step S306 in the flowchart illustrated in the example in FIG. 3) according to the present exemplary embodiment. In this process, the past approval proportion is used as a disclosure possibility. In other words, a "user having a high disclosure possibility" is extracted by using the past approval proportion.

In step S1502, a user owning target information is extracted.

In step S1504, an approval proportion is calculated for each user in a case where there is information request. The approval proportion is calculated by using the request log table 500.

In step S1506, a user whose approval proportion is more than a predefined threshold value is extracted.

FIGS. 16A to 16E are diagrams illustrating a process example according to the present exemplary embodiment. Three messages (a mail sentence 1600, a mail sentence 1610, and a mail sentence 1620) are illustrated.

In the example in FIG. 16A, there is the following mail sentence 1600. "It seems that a sealing request application method has been changed. Please ask Mr. N of the General Affairs Department details thereof."

In the example in FIG. 16B, there is the following mail sentence 1610. "It seems that a sealing request application method has been changed. I will inform you what I heard from N a while ago. "Changes" The latest version of the written sealing request is placed on the website of the General Affairs Department. The approval of the director is no longer necessary, but a copy of the approval document is attached at the time of application. Thank you."

In the example in FIG. 16C, there is the following mail sentence 1620. "The sealing request application method has been changed, and thus a written sealing request is renewed. Please ask Mr. N of the General Affairs Department details thereof."

FIG. 16D is a diagram illustrating a data structure example of a disclosure approval proportion table 1630.

The disclosure approval proportion table 1630 has an information provider field 1632 and a disclosure approval proportion field 1634. The information provider field 1632 stores an information provider. The disclosure approval proportion field 1634 stores a disclosure approval proportion. This may be calculated by using the request log table 500 for the respective users who are owners (sender) of the mail sentence 1600, the mail sentence 1610, and the mail sentence 1620. For example, in a case where a threshold value is 0.3 in step S1506 in the flowchart of FIG. 15, it is determined that "A", "B", and "C" are "users having a high disclosure possibility".

FIG. 16E is a diagram illustrating a data structure example of the delivery priority table 1640.

The delivery priority table 1640 has a mail field 1642, a disclosure possibility field 1644, a receiver needs field 1646, and a delivery priority field 1648. The mail field 1642 stores a mail. The disclosure possibility field 1644 stores a disclosure possibility. Herein, as a value of the disclosure possibility field 1644, a value of the disclosure approval proportion field 1634 of the disclosure approval proportion table 1630 is used. The receiver needs field 1646 stores a receiver needs (necessity of information). The receiver needs will be described later by using an example in FIG. 18. The delivery priority field 1648 stores a delivery priority. The delivery priority is calculated by multiplying the value of the disclosure possibility field 1644 by the value of the receiver needs field 1646.

FIG. 17 is a flowchart illustrating a process example (a process example in step S306 in the flowchart illustrated in the example in FIG. 3) according to the present exemplary embodiment. In this process, a "user having a high disclosure possibility" (owner) is extracted according to a relationship between a receiver (requester) and an owner. There is a case where, for some users, an approval proportion is changed depending on a disclosure partner, such as "an approval being given in a case of a close person", "an approval being given in a case of an identical department", or "an approval being given in a case of an identical generation".

A user performing disclosure is selected by using a relationship of each user.

In step S1702, a user owning target information is extracted.

In step S1704, a relationship between a user A requesting information and a user B extracted in step S1702 is extracted.

In step S1706, the user B of which the relationship between the user A and the user B is a predefined relationship is extracted.

As the "relationship between the user A and the user B" in step S1704, there are, for example, (1) the number of times of transmission and reception of messages between the user A and the user B, (2) a distance on an organization chart (for example, in a case of the organization chart having a tree structure, the number of nodes in a case of tracing from the user A to the user B (or from the user B to the user A)), (3) the way of using honorific expressions in a message between the user A and the user B (for example, the way of using honorific expressions may be extracted through a natural language process; and there is whether or not the user B has a higher social relationship than the user A), and (4) attributes of both of the users A and B (for example, an age or a sex).

The predefined relationship may include that, for example, (R1) the number of times of transmission and reception is larger than a predefined number of times, (R2) a distance is shorter than a predefined value, (R3) honorific expressions are not used, or the user B has a higher social relationship than the user A, and (R4) the number of identical attributes is more than a predefined value.

FIG. 18 is a flowchart illustrating a process example according to the present exemplary embodiment.

In step S1802, in a case where information similar to requested information is received, an action of a user making the request is extracted from an operation action log table 1900. For example, a drop operation on a schedule is extracted. FIG. 19 is a diagram illustrating a data structure example of the operation action log table 1900. The operation action log table 1900 has an operation action log ID field 1910, a date and time field 1920, a user field 1930, and an operation action field 1940. The operation action log ID field 1910 stores information (operation action log ID) for uniquely identifying an operation action log in the present exemplary embodiment. The date and time field 1920 stores the date and time at which the operation is performed. The user field 1930 stores a user performing the operation. The operation action field 1940 stores an operation action. As a stored operation action, there is, for example, a copying operation for electronic mail text or a drop operation on a schedule.

In step S1804, in a case where the similar information and a plan described in the schedule has a predefined relationship, the user's necessity is increased. Here, the "similar information" is information similar to the requested information. The "predefined relationship" includes, for example, a relationship in which all pieces of text match each other, a relationship in which some text match each other, a relationship of similar semantics (for example, a difference between semantic vectors of words of both of the two is less than a predefined threshold value), or a relationship in which the date and time described in information matches the date and time in the schedule.

For example, it is assumed that the user's necessity (the necessity of information) is "1" at a time point where the information is requested. In other words, there is the request, and thus the necessity is at least "1" (default value). In a case where the past operation action performed in a case of obtaining similar information is a copying action to the schedule (step S1802), and the similar information and a plan described in the schedule has a predefined relationship, the necessity is increased (for example, 1 is added).

Figure 20:
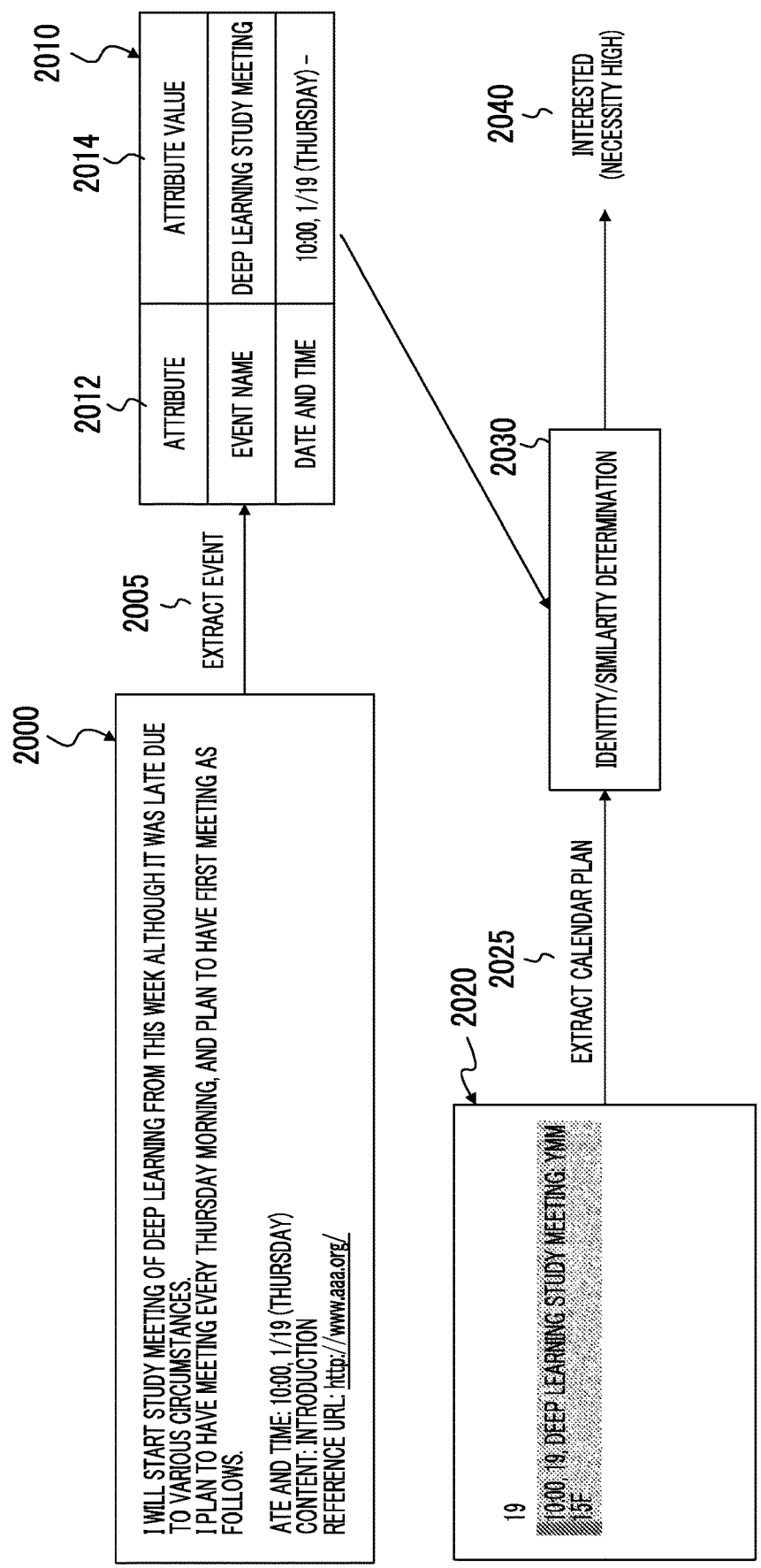
FIG. 20 is a diagram illustrating a process example according to the present exemplary embodiment.

FIG. 20 is a diagram illustrating a process example according to the present exemplary embodiment. A description will be made of a process example in step S1804 in a case where information similar to requested information is received, and a user's action extracted from the operation action log table 1900 is a "drop operation on the schedule".

For example, a value indicating the necessity is measured on the basis of whether or not an event is input to the schedule after an event guidance mail such as an academic participation report or lecture information is viewed.

In an example in FIG. 20, there is the following mail sentence 2000. "I will start the study meeting of Deep Learning from this week although it was late due to various circumstances. I plan to have the meeting every Thursday morning, and plan to have the first meeting as follows. Date and time: 10:00, January 19 (Thursday), Content: Introduction, and reference URL: http://www.aaa.org/"

The event is extracted (2005) from the mail sentence 2000, and an attribute table 2010 is generated. The attribute table 2010 has an attribute field 2012 and an attribute value field 2014. The attribute field 2012 stores an attribute. The attribute value field 2014 stores an attribute value. In the example in FIG. 20, there is a calendar 2020 with the content "10:00, 19, Deep Learning study meeting: YMM 15F".

A calendar plan is extracted (2025) from the calendar 2020 of the target user (the user requesting the information). For example, the content "10:00, 19, Deep Learning study meeting: YMM 15F" is extracted. Since the date and time is identical, and the "Deep Learning study meeting" portion is also identical, the similarity is high in identity/similarity determination 2030, and thus it is determined that the user is interested in the meeting (necessity is high) (2040). In this case, 1 is added to the value of the receiver needs field 1646 of the delivery priority table 1640 (for example, "1" is added to the default value "1", and thus "2" is obtained).

Figure 21:
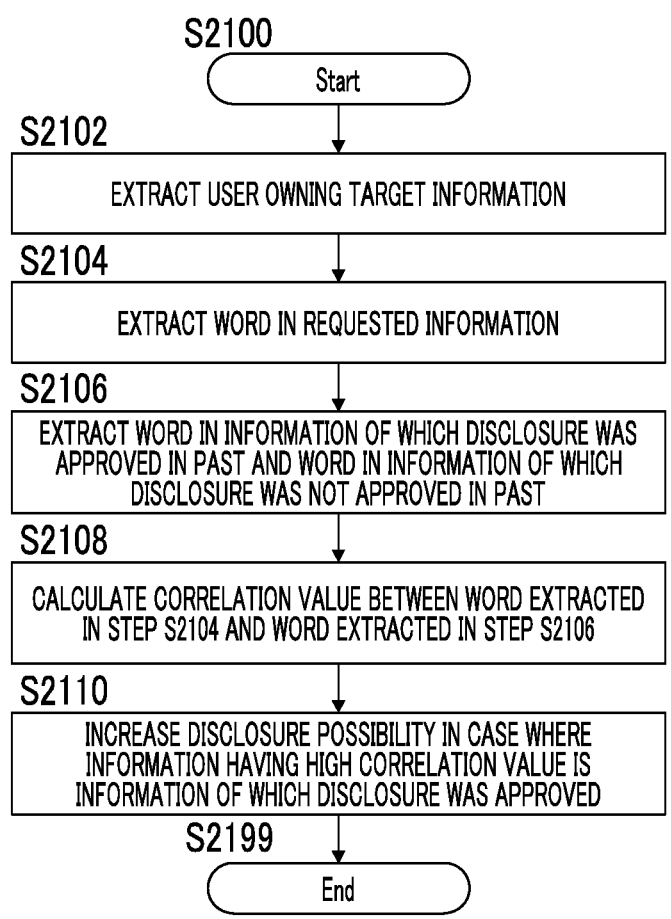
FIG. 21 is a flowchart illustrating a process example according to the present exemplary embodiment.

FIG. 21 is a flowchart illustrating a process example (a process example in step S306 in the flowchart illustrated in the example in FIG. 3) according to the present exemplary embodiment. FIG. 21 illustrates an example in which a disclosure possibility of delivery target information is determined by using a word in the delivery target information and a word used in information disclosed in the past. In other words, in a case where the delivery target information is similar to the information disclosed in the past, the fact that a disclosure possibility is high is used.

In step S2102, a user owning target information is extracted.

In step S2104, a word in requested information is extracted.

In step S2106, a word in information of which disclosure was approved in the past and a word in information of which disclosure was not approved in the past are extracted.

In step S2108, a correlation value between the word extracted in step S2104 and the word extracted in step S2106 is calculated.

In step S2110, in a case where information having a high correlation value is the information of which disclosure was approved, a disclosure possibility is increased.

A correlation between a history of a user's disclosure approval and a text content is measured such that a content which may be disclosed by the user is estimated, and thus an expected value of a disclosure permission for new content is derived.

Specifically, the following is performed.

1. A mutual information amount MiWiMir of a result $Mir=\{0,1\}$ of disclosure permissions for each word Wi included in text of an electronic mail Mi for requesting an approval and the electronic mail Mi is calculated.

2. A mutual information amount of each word included in text of an unknown electronic mail UM is obtained, and is set as a disclosure expected value (disclosure possibility).

FIG. 22 is a diagram illustrating a process example (a process example in the flowchart of FIG. 21) according to the present exemplary embodiment.

For example, there is a mail sentence 2210 as a message for which a disclosure permission is obtained. The mail sentence 2210 is as follows. "It is hard to go to a university while working, but the requirement for a doctorial dissertation is much more difficult since the number of papers is doubled! Although it may not cost tuition, the university has different requirements for obtaining a degree, so I think that further examination is better, but the related information is not open much . . . ". Extracted words are "university", "requirement", "doctorial dissertation", "paper", "tuition", "university", and "requirements for obtaining a degree".

For example, as a message for which a disclosure permission is not obtained, there is a mail sentence 2220. The mail sentence 2220 is as follows. "While it is hard to promote career change while working, we recommend that you register yourself in a plurality of career change agents. It is also important to check things such as salary and pay raise beforehand properly! I think that further examination is better because companies are different for each agent, but the related information is not open much . . . ". Extracted words are "career change", "career change agent", "salary", "pay raise", "agent", and "company".

Here, there are mail sentences 2215 and 2225 as disclosure target messages. Of course, a determination of an owner is not performed with respect to whether or not these are disclosed.

For example, the mail sentence 2215 is as follows. "The university's tuition was 1 million yen in the first year due to the entrance fee, but it was about 600,000 yen after that. Because the university was a private university, I think that tuition and fees are high compared with national universities." Extracted words are "university", "tuition", "university", and "tuition".

For example, the mail sentence 2225 is as follows. "The salary of C Company was 6 million yen including tax in the first year, but thereafter it was raised to about 6.5 million yen. I think that the salary level is high compared with other companies." Extracted words are "salary", "pay raise", "company", and "salary".

Since the words included in the mail sentence 2210 are included in the mail sentence 2215 more than the mail sentence 2225, and the words included in the mail sentence 2220 are included in the mail sentence 2225 more than the mail sentence 2215, the mail sentence 2215 is higher than the mail sentence 2225 in terms of the disclosure permission possibility.

Figure 23:
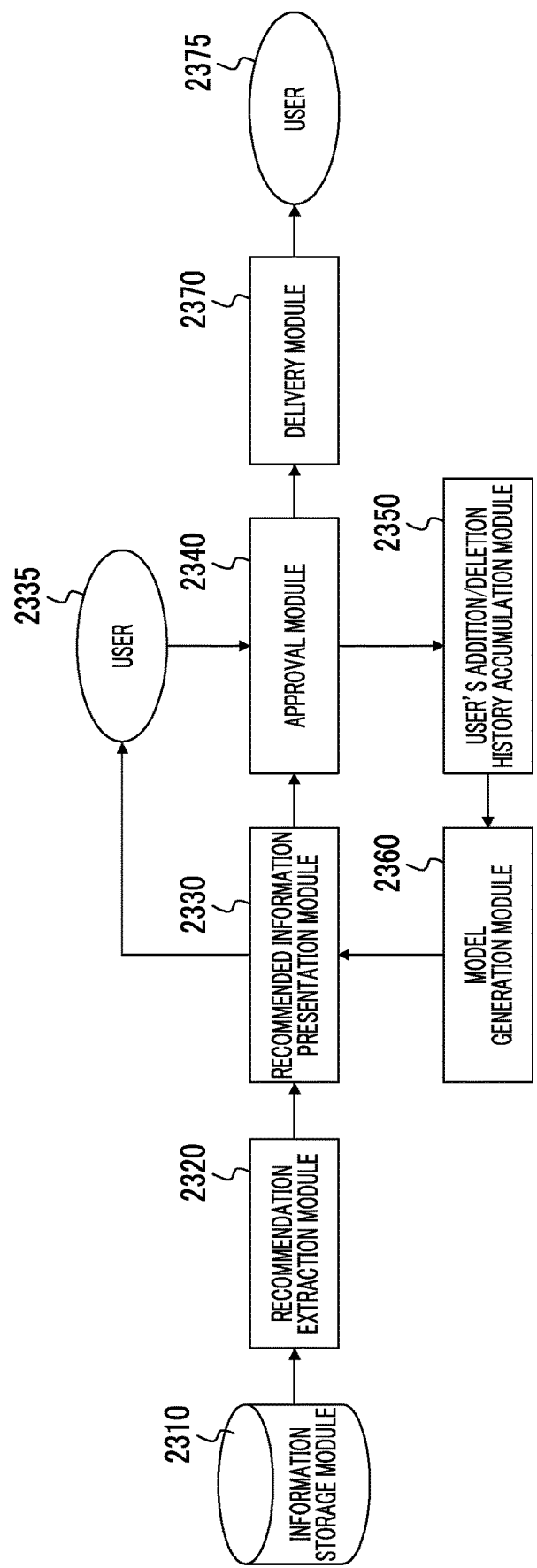
FIG. 23 is a conceptual module configuration diagram illustrating a configuration example according to the present exemplary embodiment.

FIG. 23 is a conceptual module configuration diagram illustrating a configuration example according to the present exemplary embodiment.

An information storage module 2310 is connected to a recommendation extraction module 2320. The information storage module 2310 is equivalent to the above-described information storage module 115.

The recommendation extraction module 2320 is connected to the information storage module 2310 and a recommended information presentation module 2330. The recommendation extraction module 2320 is equivalent to the above-described information extraction module 110.

The recommended information presentation module 2330 is connected to the recommendation extraction module 2320, an approval module 2340, and a model generation module 2360. The recommended information presentation module 2330 performs a process, corresponding to a part of the process in the above-described disclosure module 140, of presenting target information to a user 2335 (information owner), and obtaining an approval for disclosure of the information.

The approval module 2340 is connected to the recommended information presentation module 2330, a user's addition/deletion history accumulation module 2350, and a delivery module 2370. The approval module 2340 performs a process, corresponding to a part of the process in the above-described disclosure module 140, of receiving an approval for disclosure of the information from the user 2335. In this case, the approval may be given on the condition that the user 2335 performs editing (partial deletion, addition, or the like).

The user's addition/deletion history accumulation module 2350 is connected to the approval module 2340 and the model generation module 2360. The user's addition/deletion history accumulation module 2350 stores a history of editing performed by the user 2335.

The model generation module 2360 is connected to the recommended information presentation module 2330 and the user's addition/deletion history accumulation module 2350. The model generation module 2360 performs machine learning by using information in the user's addition/deletion history accumulation module 2350 as teacher data, and generates a model for editing information. The recommended information presentation module 2330 presents edited information in presentation of information in a case of requesting an approval of the user 2335. Consequently, for example, information can be edited and presented depending on a user being aware of privacy or a user not being aware of privacy. Information can be edited according to a relationship of trust between the user 2335 and a user 2375.

The delivery module 2370 is connected to the approval module 2340. The delivery module 2370 delivers the target information to the user 2375 (information requester).

Figure 24:
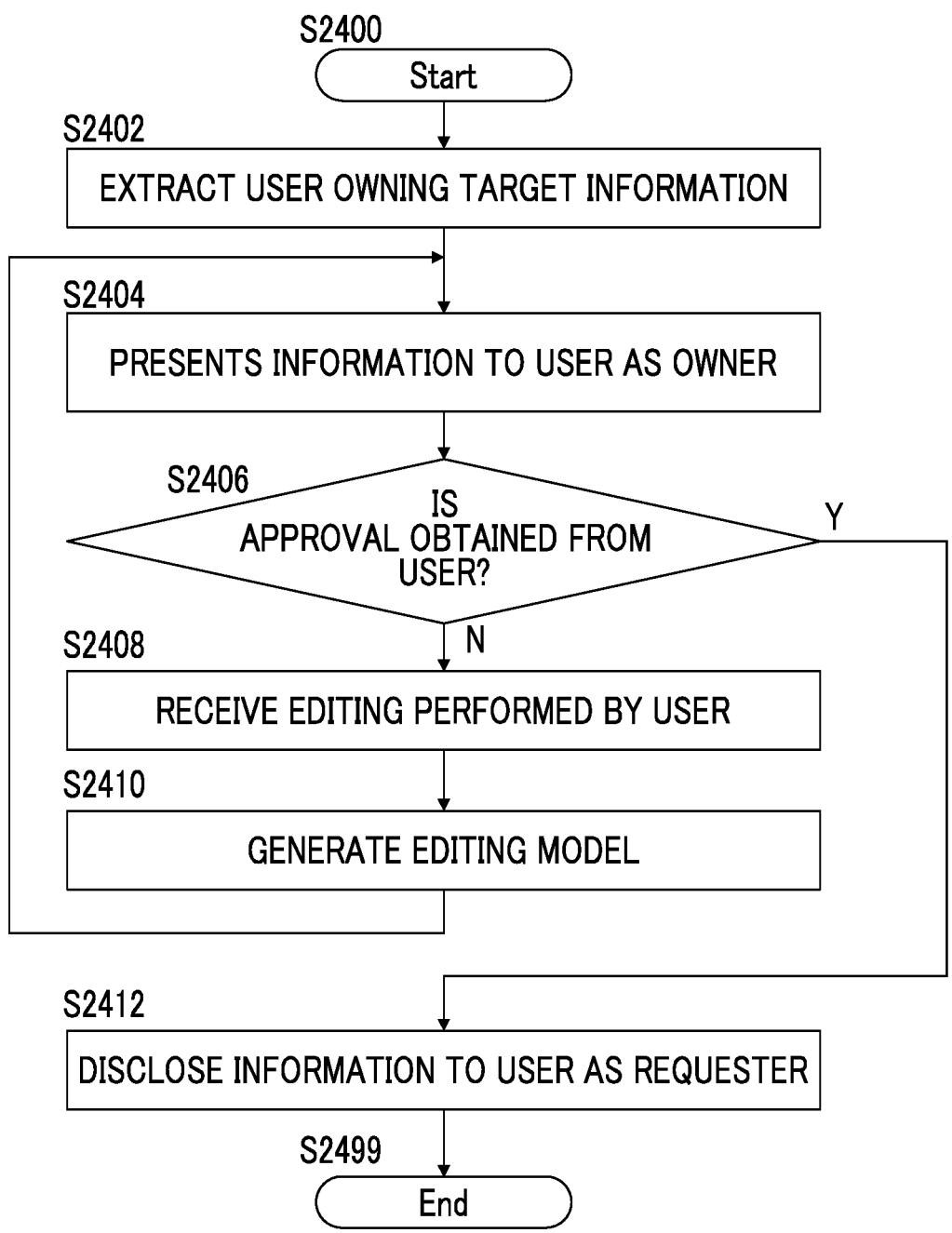
FIG. 24 is a flowchart illustrating a process example according to the present exemplary embodiment.

FIG. 24 is a flowchart illustrating a process example according to the present exemplary embodiment.

In step S2402, the recommendation extraction module 2320 extracts a user owning target information.

In step S2404, the recommended information presentation module 2330 presents the information to the user as an owner.

In step S2406, the approval module 2340 determines whether or not an approval is obtained from the user, and proceeds to step S2412 in a case where the approval is obtained, and proceeds to step S2408 in other cases.

In step S2408, the user's addition/deletion history accumulation module 2350 receives editing performed by the user.

In step S2410, the model generation module 2360 generates an editing model, and returns to the step S2404.

In step S2412, the delivery module 2370 discloses the information to a user as a requester.

Figure 25:
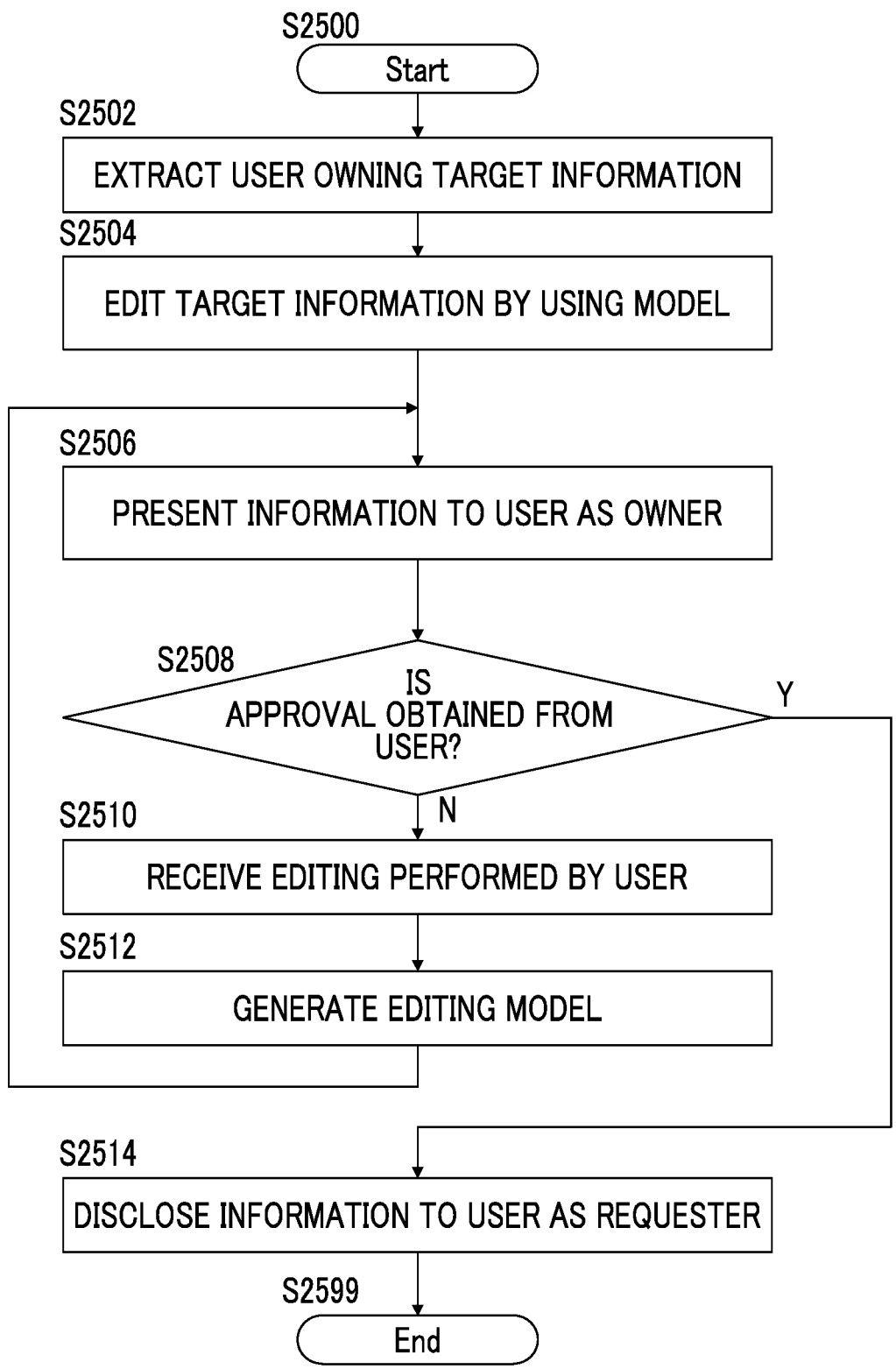
FIG. 25 is a flowchart illustrating a process example according to the present exemplary embodiment.

FIG. 25 is a flowchart illustrating a process example according to the present exemplary embodiment. After learning is performed through the process in the flowchart illustrated in the example in FIG. 24, the recommended information presentation module 2330 edits information, and presents the edited information to an owner of the information.

In step S2502, the recommendation extraction module 2320 extracts a user owning target information.

In step S2504, the recommended information presentation module 2330 edits the target information by using a model.

In step S2506, the recommended information presentation module 2330 presents the information to the user as an owner.

In step S2508, the approval module 2340 determines whether or not an approval is obtained from the user, and proceeds to step S2514 in a case where the approval is obtained, and proceeds to step S2510 in other cases.

In step S2510, the user's addition/deletion history accumulation module 2350 receives editing performed by the user.

In step S2512, the model generation module 2360 generates an editing model, and returns to the step S2506.

In step S2514, the delivery module 2370 discloses the information to a user as a requester.

Figure 26:
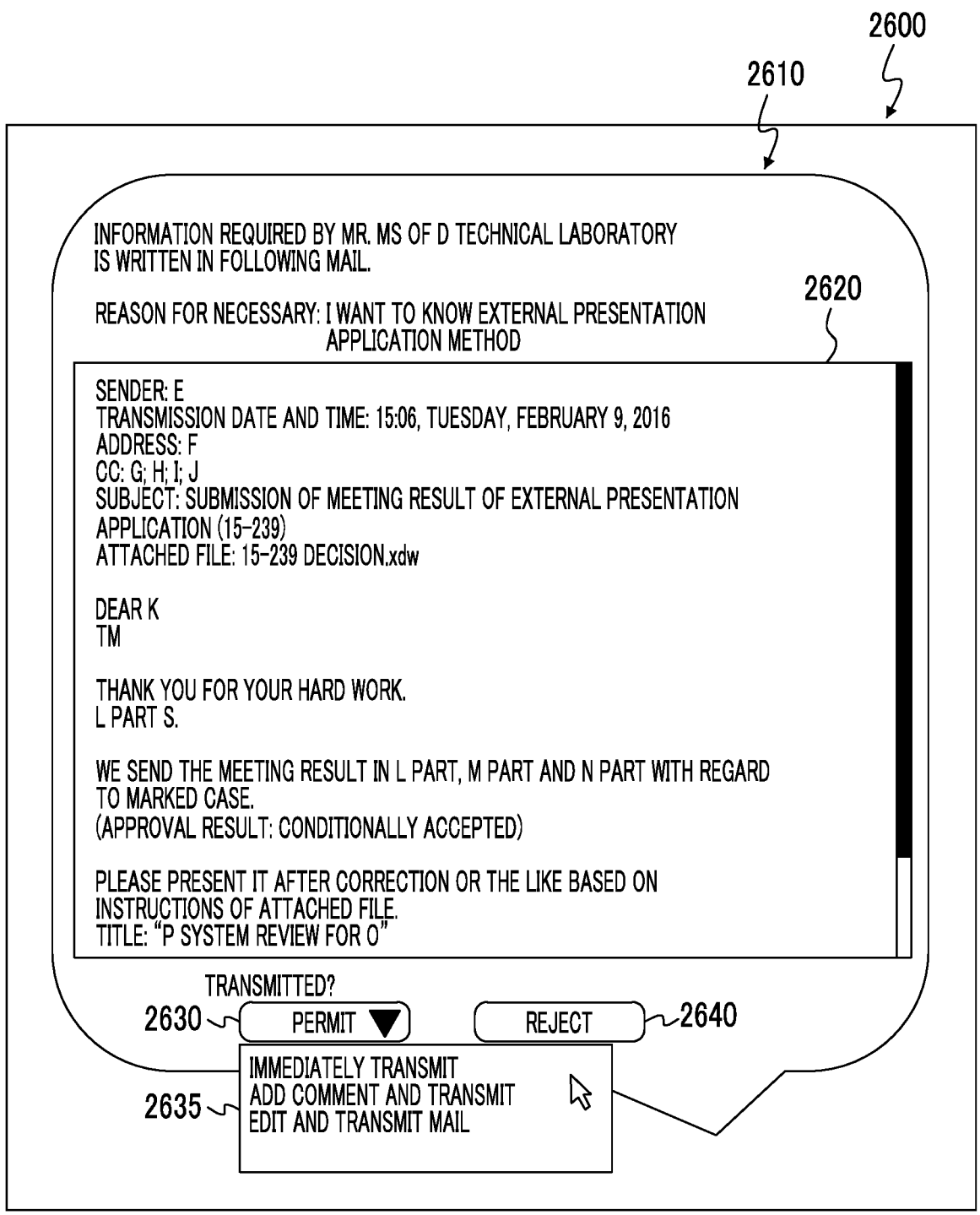
FIG. 26 is a diagram illustrating a process example according to the present exemplary embodiment.

FIG. 26 is a diagram illustrating a process example according to the present exemplary embodiment.

An approval region 2610, an information presentation region 2620, a permission button 2630, a permission menu 2635, and a rejection button 2640 are presented on a screen 2600.

For example, "information required by Mr. MS of D Technical Laboratory is written in the following mail; and reason for necessary: I want to know an external presentation application method" is displayed in the approval region 2610.

For example, the following content is displayed in the information presentation region 2620. "Sender: E, transmission date and time: 15:06, Tuesday, Feb. 9, 2016, address: F, CC: G, H, I, J, subject: submission of meeting result of external presentation application (15-239), attached file: 15-239 decision.xxx, dear K TM, thank you for your hard work. L part S. We send the meeting result in L part, M part and N part with regard to the marked case. (Approval result: conditionally accepted) Please present it after correction or the like based on the instructions of the attached file. Title: "P system review for O "". In a case where a triangular mark of the permission button 2630 is selected through an operation of the user 2335 (an owner of the information in the information presentation region 2620), the permission menu 2635 is displayed. For example, "transmit immediately, add a comment and transmit, and edit and transmit mail" is displayed in the permission menu 2635. In a case where "transmit immediately" is selected through an operation of the user 2335, the information in the information presentation region 2620 is delivered to the user 2375 without being changed. In a case where "add a comment and transmit" or "edit and transmit mail" is selected, the information in the information presentation region 2620 is edited through an operation of the user 2335, and is then delivered to the user 2375.

Figure 27:
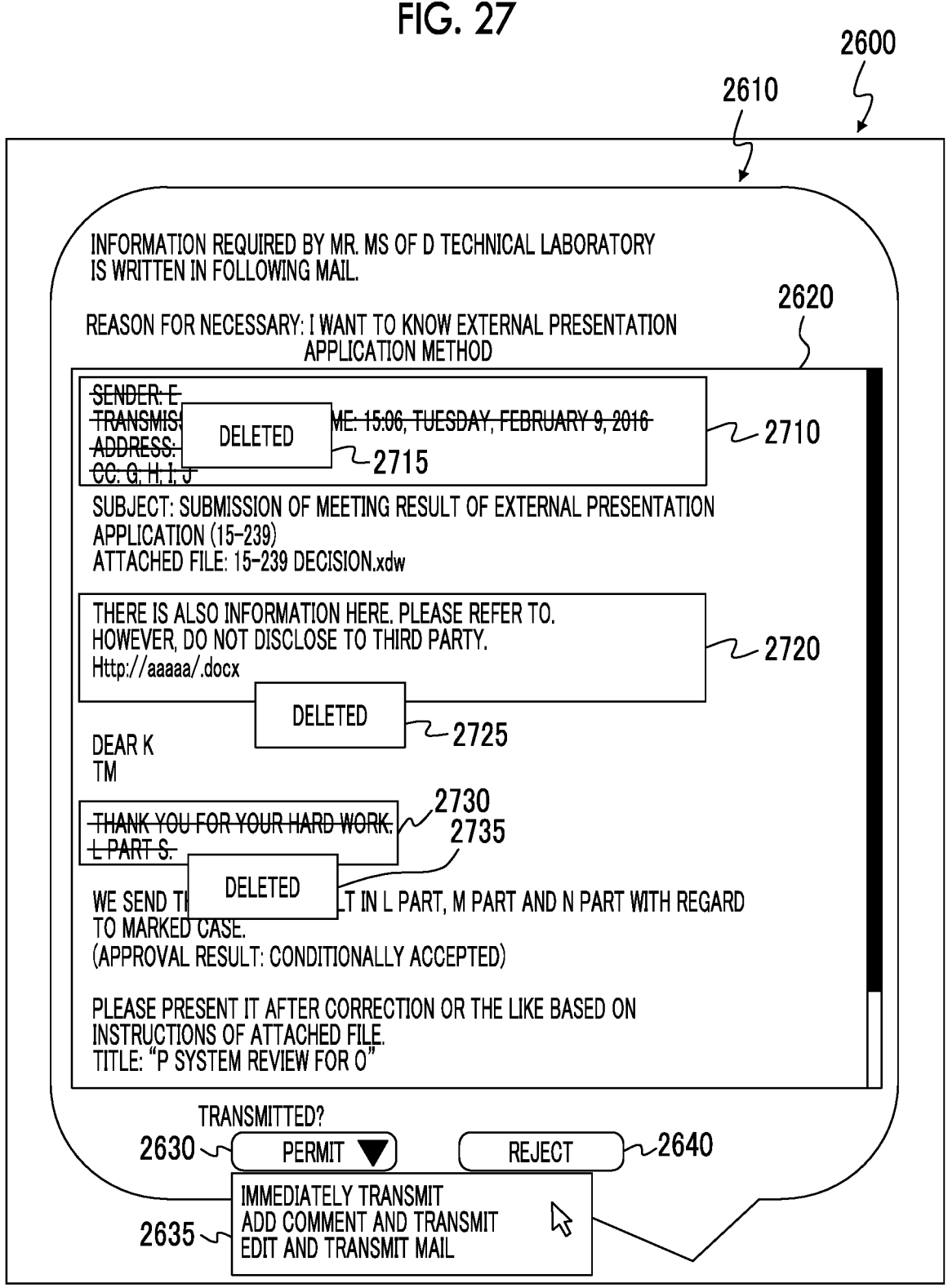
FIG. 27 is a diagram illustrating a process example according to the present exemplary embodiment.

FIG. 27 is a diagram illustrating a process example according to the present exemplary embodiment. FIG. 27 illustrates an example in which "add a comment and transmit" or "edit and transmit mail" in the permission menu 2635 is selected.

The user 2335 performs an operation such as a deletion 2715 on a target 2710, performs an operation such as an addition 2725 on a target 2720 (information addition, attention to information handling, and the like), and performs an operation such as a deletion 2735 on a target 2730.

Histories (including the contents of the target 2710, the target 2720, and the target 2730) of the deletion 2715, the addition 2725, and the deletion 2735 are used as teacher data. Such teacher data is collected, machine learning is performed such that a model is generated, and then the recommended information presentation module 2330 performs editing in step S2504 in the flowchart of FIG. 25 by using the model.

Figure 28:
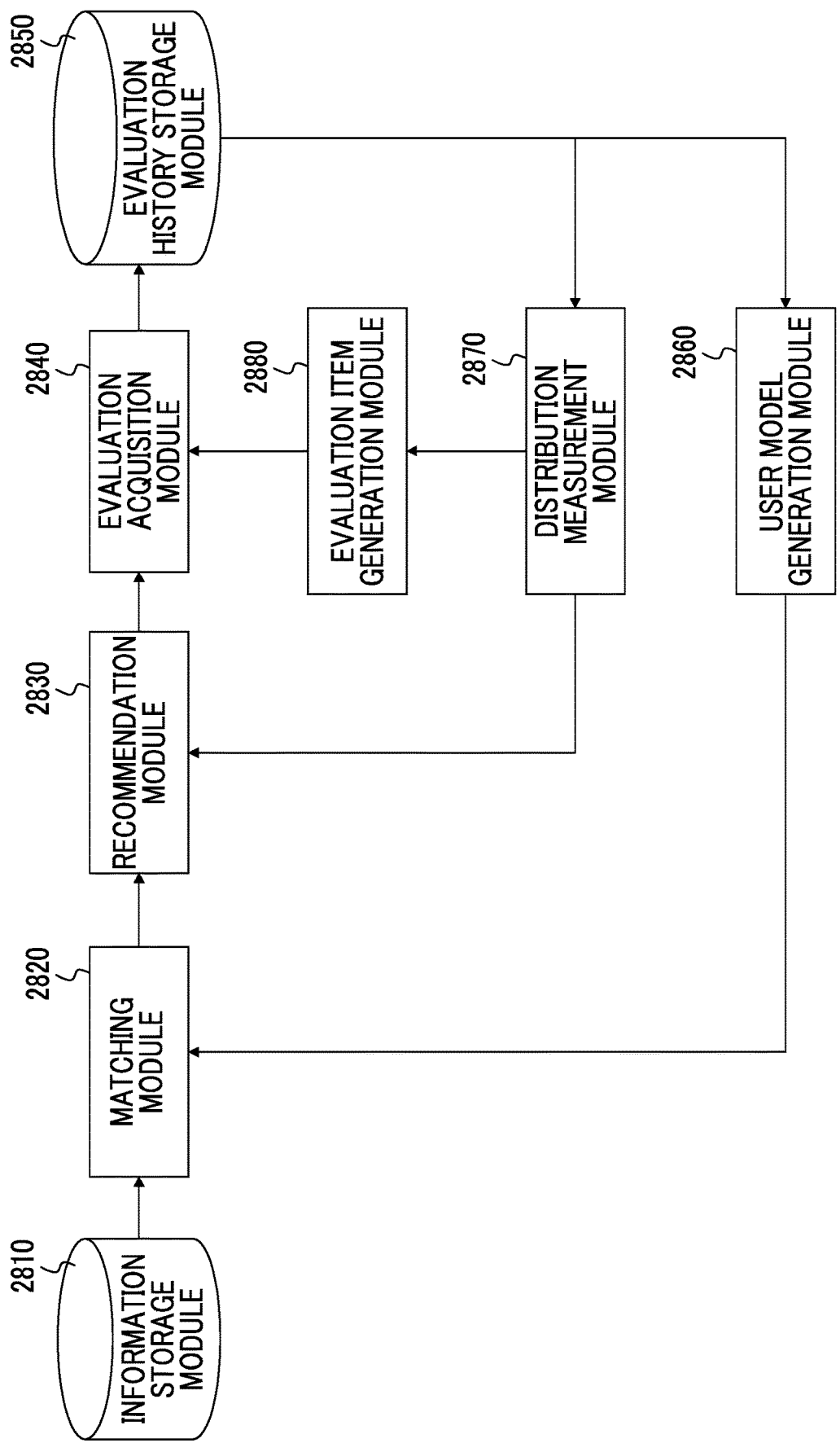
FIG. 28 is a conceptual module configuration diagram illustrating a configuration example according to the present exemplary embodiment.

FIG. 28 is a conceptual module configuration diagram illustrating a configuration example according to the present exemplary embodiment.

An information storage module 2810 is connected to a matching module 2820. The information storage module 2810 is equivalent to the above-described information storage module 115.

The matching module 2820 is connected to the information storage module 2810, a recommendation module 2830, and a user model generation module 2860. The matching module 2820 is equivalent to the above-described information extraction module 110.

The recommendation module 2830 is connected to the matching module 2820, an evaluation acquisition module 2840 and a distribution measurement module 2870. The recommendation module 2830 is equivalent to the above-described disclosure module 140.

The evaluation acquisition module 2840 is connected to the recommendation module 2830, an evaluation history storage module 2850, and an evaluation item generation module 2880. The evaluation acquisition module 2840 is equivalent to the above-described evaluation reception module 150.

The evaluation history storage module 2850 is connected to the evaluation acquisition module 2840, the user model generation module 2860, and the distribution measurement module 2870. The evaluation history storage module 2850 stores an evaluation obtained from a user who is a receiver (information requester) by the evaluation acquisition module 2840.

The user model generation module 2860 is connected to the matching module 2820 and the evaluation history storage module 2850. The user model generation module 2860 generates a model for an information extraction process performed by the matching module 2820 by using data in the evaluation history storage module 2850 as teacher data. Then, the matching module 2820 performs a process of extracting information from the information storage module 2810 by using the model.

The distribution measurement module 2870 is connected to the recommendation module 2830, the evaluation history storage module 2850, and the evaluation item generation module 2880. The distribution measurement module 2870 is equivalent to the above-described extraction module 155.

The evaluation item generation module 2880 is connected to the evaluation acquisition module 2840 and the distribution measurement module 2870. The evaluation item generation module 2880 generates an evaluation item to be presented to a user who is a receiver according to a process result in the distribution measurement module 2870. For example, an evaluation item is dynamically set by taking into consideration a bias of an evaluation history, and thus just enough learning data is collected. Consequently, since a just enough evaluation can be obtained, recommendation accuracy can be improved for people having a minority preference.

Figure 29:
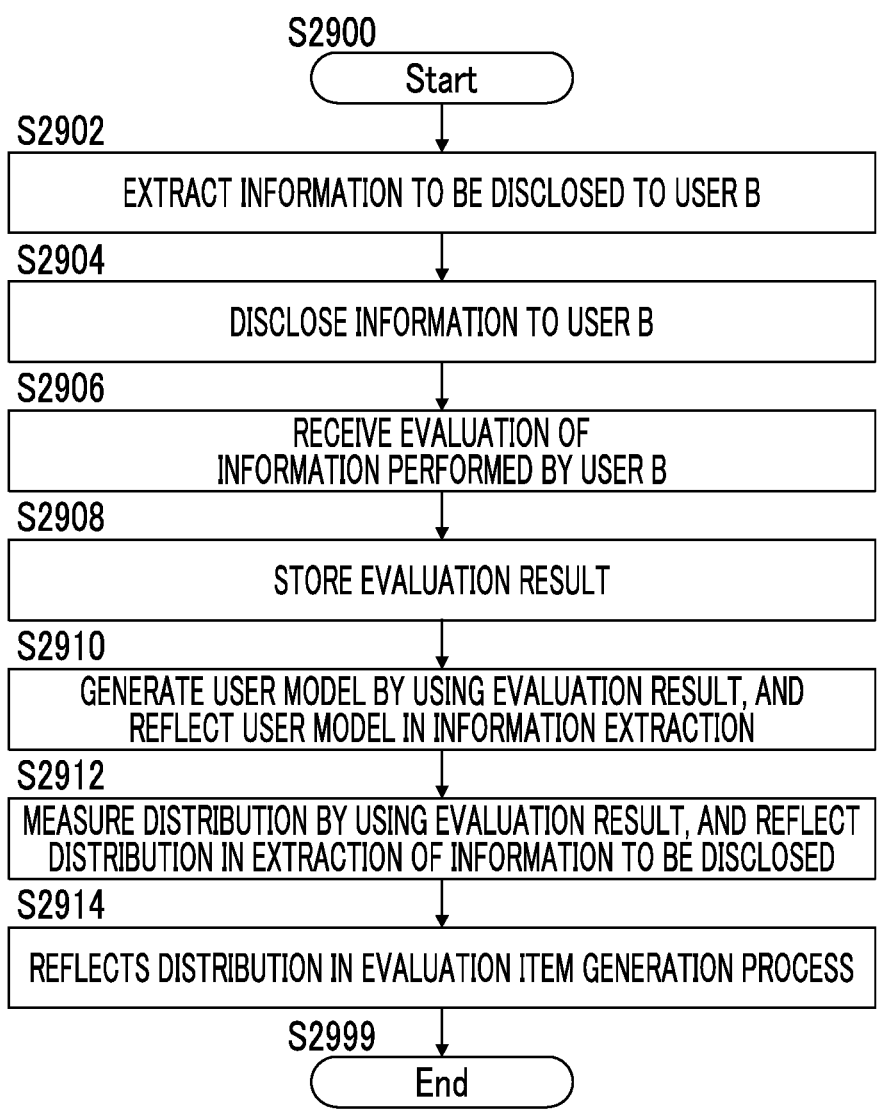
FIG. 29 is a flowchart illustrating a process example according to the present exemplary embodiment.

FIG. 29 is a flowchart illustrating a process example according to the present exemplary embodiment.

In step S2902, the matching module 2820 extracts information to be disclosed to the user B (a receiver of information or a requester of the information).

In step S2904, the recommendation module 2830 discloses the information to the user B.

In step S2906, the evaluation acquisition module 2840 receives an evaluation of the information performed by the user B.

In step S2908, the evaluation history storage module 2850 stores the evaluation result.

In step S2910, the user model generation module 2860 generates a user model by using the evaluation result, and reflects the user model in information extraction.

In step S2912, the distribution measurement module 2870 measures a distribution by using the evaluation result, and reflects the distribution in extraction of the information to be disclosed.

In step S2814, the evaluation item generation module 2880 reflects the distribution in an evaluation item generation process.

Figure 30:
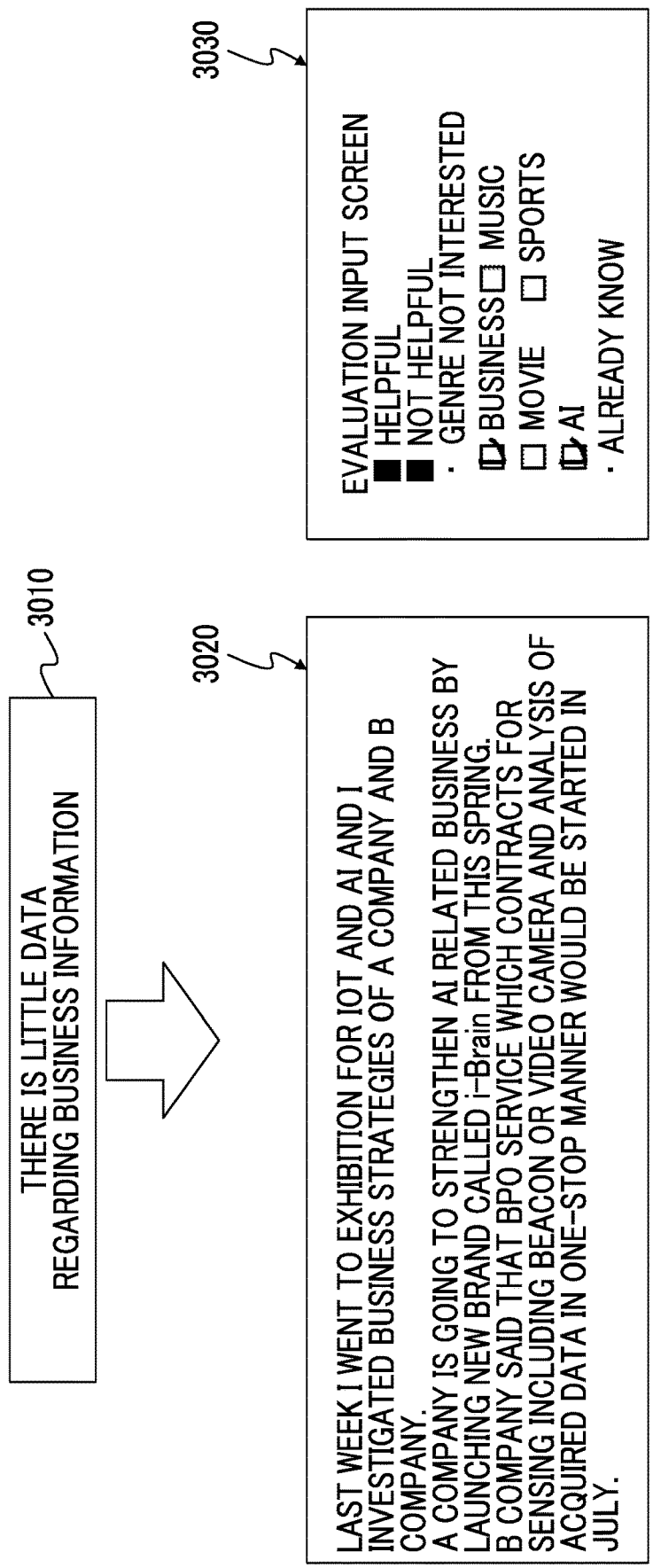
FIG. 30 is a diagram illustrating a process example according to the present exemplary embodiment.

FIG. 30 is a diagram illustrating a process example according to the present exemplary embodiment.

For example, as a distribution result 3010, "a small amount of evaluation data regarding business information being small" is obtained. In this case, information in an information presentation screen 3020 which is the "business information" is deliberately presented. In other words, the matching module 2820 does not extract the information in the information presentation screen 3020, but presents the information in the information presentation screen 3020 such that evaluation data is obtained. To do so, an evaluation input screen 3030 is displayed. Evaluation items in the evaluation input screen 3030 are in an initially set state, and, in a case where an evaluation is performed by using the evaluation items, a large amount of information (that is, data serving as teacher data) can be obtained. In a case where a large number of evaluation results are obtained on the evaluation input screen 3030, it is possible to improve the accuracy of teacher data regarding business.

Figure 31:
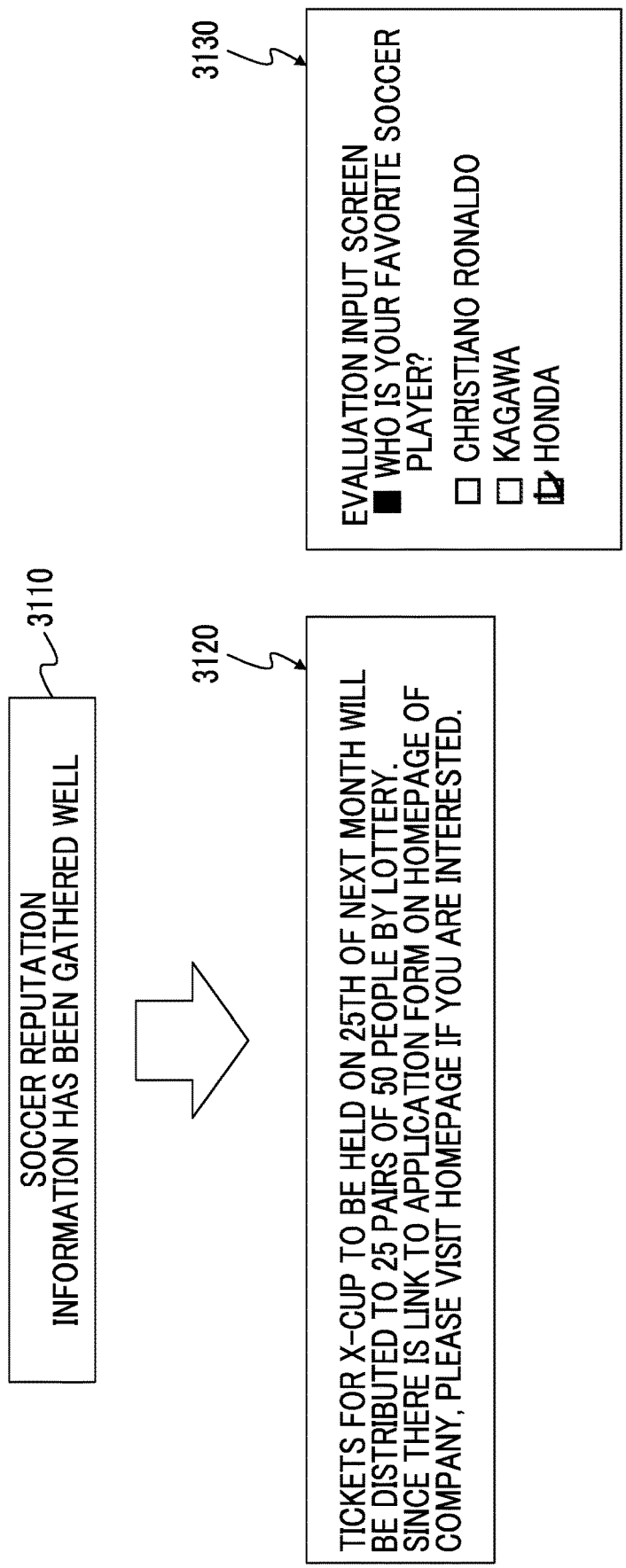
FIG. 31 is a diagram illustrating a process example according to the present exemplary embodiment.

FIG. 31 is a diagram illustrating a process example according to the present exemplary embodiment. FIG. 31 illustrates an example opposite to the example in FIG. 30.

For example, as a distribution result 3110, "enough soccer reputation information being collected" is obtained. In this case, in a case where an information presentation screen 3120 is presented as the "soccer reputation information", an evaluation input screen 3130 is displayed. Since "enough soccer reputation information is collected", evaluation items in the evaluation input screen 3130 are displayed in order to collect an evaluation result of data which is desired to be collected in detail.

Figure 32:
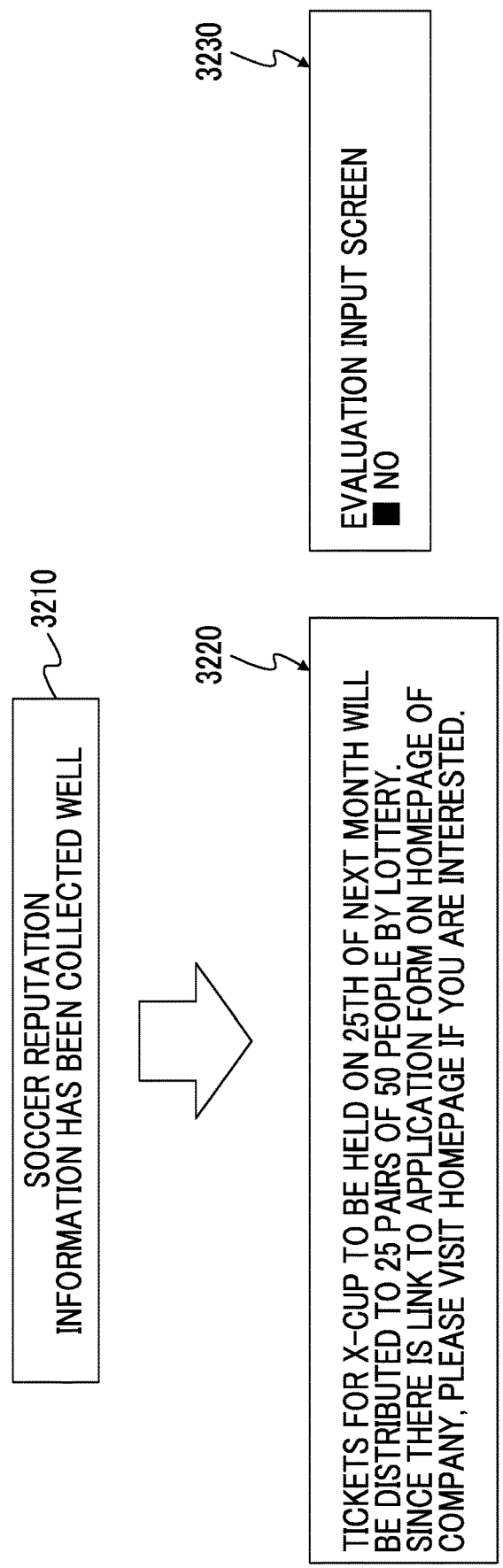
FIG. 32 is a diagram illustrating a process example according to the present exemplary embodiment.

FIG. 32 is a diagram illustrating a process example according to the present exemplary embodiment. FIG. 32 illustrates an example which is different from the example in FIG. 31.

For example, as a distribution result 3210, "enough soccer reputation information being collected" is obtained. In this case, in a case where an information presentation screen 3220 is presented as the "soccer reputation information", an evaluation input screen 3230 is displayed. Since "enough soccer reputation information is collected", evaluation data sufficient to generate a model is collected, and thus a burden on a user is reduced by stopping evaluation input.

Figure 33:
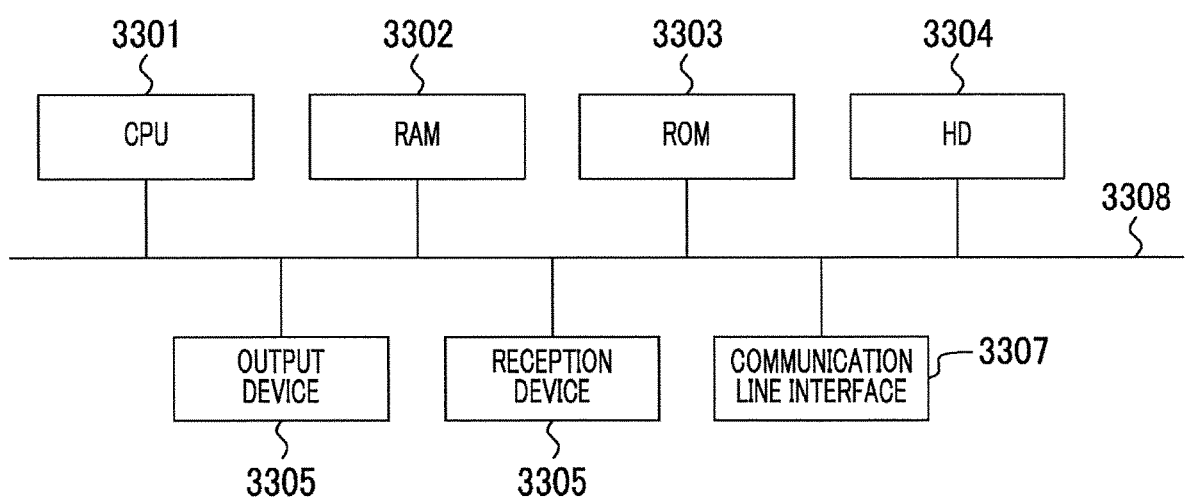
FIG. 33 is a block diagram illustrating a hardware configuration example of a computer realizing the present exemplary embodiment.

A hardware configuration of a computer executing a program as the present exemplary embodiment is a hardware configuration of a general computer as exemplified in FIG. 33, and the computer is, specifically, a personal computer or a computer serving as a server. In other words, as a specific example, a CPU 3301 is used as a processing unit (calculation unit), and a RAM 3302, a ROM 3303, and an HD 3304 are used as a storage device. For example, a hard disk or a solid state drive (SSD) may be used as the HD 3304. The computer includes the CPU 3301 executing programs such as the request reception module 105, the information extraction module 110, the delivery priority determination module 120, the disclosure possibility determination module 125, the necessity determination module 135, the disclosure module 140, the evaluation module 145, the recommendation extraction module 2320, the recommended information presentation module 2330, the approval module 2340, user's addition/deletion history accumulation module 2350, the model generation module 2360, the delivery module 2370, the matching module 2820, the recommendation module 2830, the evaluation acquisition module 2840, the user model generation module 2860, the distribution measurement module 2870, and the evaluation item generation module 2880; the RAM 3302 storing the programs or data; the ROM 3303 storing a program or the like for activing the computer; the HD 3304 which is an auxiliary storage device (which may be a flash memory or the like) functioning as the information storage module 115, the history storage module 130, the information storage module 2310, the information storage module 2810, and the evaluation history storage module 2850; a reception device 3306 which receives data on the basis of a user's operation (including an action, a voice, a visual line, and the like) on a keyboard, a mouse, a touch screen, a microphone, or a camera (including a visual line detection camera or the like); an output device 3305 such as a CRT, a liquid crystal display, or a speaker; a communication line interface 3307 for connection to a communication network such as a network interface card; and a bus 3308 connecting the above-described elements to each other for exchanging data. Such a plurality of computers may be connected to each other via a network.

Among the above-described exemplary embodiments, in a case of the exemplary embodiment based on a computer program, the computer program which is software is read to a system having the present hardware configuration, and the exemplary embodiment is realized through cooperation between the software and the hardware resources.

The hardware configuration illustrated in FIG. 33 corresponds to one configuration example, and the present exemplary embodiment is not limited to the configuration illustrated in FIG. 33, and any configuration in which the modules described in the present exemplary embodiment can be executed may be used. For example, some of the modules may be configured with dedicated hardware (for example, an application specific integrated circuit (ASIC)), some of the modules may be provided in an external system, and may be connected to a communication line, and such a plurality of systems illustrated in FIG. 33 may be connected to each other via a communication line so as to operate in cooperation therebetween. Particularly, the modules may be incorporated not only into a personal computer but also into a portable information communication apparatus (including a mobile phone, a smart phone, a mobile apparatus, a wearable computer, and the like), an information appliance, a robot, a copier, a facsimile, a scanner, a printer, a multifunction peripheral (an image processing apparatus having two or more functions of a scanner, a printer, copier, and a facsimile).

In the comparison process in a description of the exemplary embodiment, "equal to or more than", "equal to or less than", "more than", and "less than" may be respectively "more than", "less than", "equal to or more than", and "equal to or less than" as long as a combination thereof does not cause contradiction.

The program may be stored on a recording medium so as to be provided, and the program may be provided by using a communication unit. In this case, for example, the program may be understood as the invention of a "non-transitory computer readable medium storing the program".

The "non-transitory computer readable medium storing the program" indicates a computer readable recording medium storing the program, used to install, execute, and distribute the program.

The recording medium includes, for example, "a DVD-R, a DVD-RW, a DVD-RAM, or the like" which is a digital versatile disc (DVD) and is a standard defined in the DVD forum, and "a DVD+R, DVD+RW, or the like" which is a standard defined in the DVD+RW, a compact disc (CD) read only memory (CD-ROM), a CD recordable (CD-R), or a CD rewritable (CD-RW), a Blu-ray (registered trademark) disc, a magnetooptical disc (MO), a flexible disk (FD), a magnetic tape, a hard disk, a read only memory (ROM), an electrically erasable programmable read only memory (EEPROM) (registered trademark), a flash memory, a random access memory (RAM), and a secure digital (SD) memory card.

The whole or a part of the program may be recorded on the recording medium so as to be preserved or distributed. The program may be transmitted through communication, for example, by using a transmission medium such as a wired network used for a local area network (LAN), a metropolitan area network (MAN), a wide area network (WAN), the Internet, an intranet, or an extranet, a wireless communication network, or a combination thereof, and may be carried via a carrier wave mounted therewith.

The program may be a part or the whole of another program, or may be recorded on a recording medium along with a separate program. The program may be divided and recorded on a plurality of recording media. The program may be recorded in any restorable aspect such as compression or encryption.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor, configured to:
receive an information request on delivery information from an information requester;
extract a plurality of candidates of delivery information based on the information request;
specify a plurality of owners of each of the plurality of candidates of delivery information;
determine a disclosure possibility and a receiver needs corresponding to each of the plurality of owners on the basis of history information thereof, wherein the disclosure possibility corresponding to each of the plurality of owners is a proportion of past information requests being approved by the owner, and wherein the receiver needs corresponding to each of the plurality of owners is a necessity of the past information requests;
select at least one owner from the plurality of owners based on a delivery priority of each of the plurality of owners, wherein the delivery priority of each of the plurality of owners is associated with the disclosure possibility and the receiver needs in the history information, and wherein the delivery priority of the at least one owner being selected is equal to or more than a predefined threshold value;
determine at least one delivery information from the plurality of candidates of delivery information which the selected owner owns; and
disclose the determined delivery information to the information requester.

2. The information processing apparatus according to claim 1,
wherein for each of the plurality of owners, the processor uses the history information of the owner of which a degree of erudition is equal to or more than a predefined value.

3. The information processing apparatus according to claim 2,
wherein for each of the plurality of owners, the processor determines the degree of erudition on the basis of the number of question messages received by the owner.

4. The information processing apparatus according to claim 1,
wherein for each of the plurality of owners, the processor uses the history information for the owner of which a degree of teaching is equal to or more than a predefined value.

5. The information processing apparatus according to claim 4,
wherein for each of the plurality of owners, the processor determines the degree of teaching on the basis of the number of question sentences in a message received by the owner and the number of declarative sentences in a reply message.

6. The information processing apparatus according to claim 1,
wherein the processor selects the owner by using one or more of the number of times of transmission and reception of messages between the information requester and the owner, a distance on an organization chart between the information requester and the owner, a way of using honorific expressions between the information requester and the owner, or attributes of both of the information requester and the owner.

7. The information processing apparatus according to claim 1,
wherein the processor determines the necessity of the past information requests on the basis of a history of actions of the information requester on received information.

8. The information processing apparatus according to claim 7,
wherein the processor uses the history of actions of having the received information similar to the delivery information.

9. The information processing apparatus according to claim 8,
wherein the processor increases the necessity of the past information requests in a case where the received information and a plan described in a schedule have a predefined relationship after the received information is viewed.

10. The information processing apparatus according to claim 1,
wherein the processor determines the disclosure possibility corresponding to each of the plurality of owners by using a word in the delivery information and a word used in information disclosed in the past.

11. The information processing apparatus according to claim 1,
wherein the processor edits the delivery information by using a result of editing information disclosed in the past.

12. The information processing apparatus according to claim 11,
wherein the processor performs machine learning by using the result of editing the information disclosed in the past as teacher data, so as to edit the delivery information.

13. The information processing apparatus according to claim 1, wherein the processor is further configured to:
present an evaluation item for the delivery information to the information requester in a case where the delivery information is disclosed, and receives an evaluation based on selection of the evaluation item; and
extract a distribution of the evaluation.

14. The information processing apparatus according to claim 13,
wherein the processor changes an evaluation item to be presented according to the distribution.

15. The information processing apparatus according to claim 14,
wherein the processor extracts a distribution of an evaluation for a field, and
wherein the processor reduces the number of evaluation items to be presented with respect to information belonging to a field having a large number of evaluations.

16. An information processing apparatus comprising:
reception means for receiving an information request on delivery information from an information requester;
extraction means for extracting a plurality of candidates of delivery information based on the information request;
determination means for specifying a plurality of owners of each of the plurality of candidates of delivery information, determine a disclosure possibility and a receiver needs corresponding to each of the plurality of owners on the basis of history information thereof, selecting at least one owner from the plurality of owners based on a delivery priority of each of the plurality of owners, and determining at least one delivery information from the plurality of candidates of delivery information which the selected owner owns, wherein the disclosure possibility corresponding to each of the plurality of owners is a proportion of past information requests being approved by the owner, wherein the receiver needs corresponding to each of the plurality of owners is a necessity of the past information requests, wherein the delivery priority of each of the plurality of owners is associated with the disclosure possibility and the receiver needs in the history information, and wherein the delivery priority of the at least one owner being selected is equal to or more than a predefined threshold value; and
disclosure means for disclosing the determined delivery information to the information requester.

* * * * *